(12) United States Patent
Lazaratos et al.

(10) Patent No.: US 8,121,791 B2
(45) Date of Patent: Feb. 21, 2012

(54) SPECTRAL SHAPING INVERSION AND MIGRATION OF SEISMIC DATA

(75) Inventors: Spyridon Lazaratos, Houston, TX (US); Roy L. David, Spring, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 15 days.

(21) Appl. No.: 12/742,561

(22) PCT Filed: Dec. 5, 2008

(86) PCT No.: PCT/US2008/085674
§ 371 (c)(1),
(2), (4) Date: May 12, 2010

(87) PCT Pub. No.: WO2009/088602
PCT Pub. Date: Jul. 16, 2009

(65) Prior Publication Data
US 2010/0270026 A1   Oct. 28, 2010

Related U.S. Application Data

(60) Provisional application No. 61/010,407, filed on Jan. 8, 2008.

(51) Int. Cl.
*G06F 17/14* (2006.01)

(52) U.S. Cl. .................. 702/14; 702/17; 702/6; 702/16; 703/5; 166/369; 367/38; 367/50; 367/53; 367/25

(58) Field of Classification Search .................. 702/14, 702/16, 17, 5, 6; 703/5; 166/369; 367/38, 367/50, 51, 52, 53, 57, 73
See application file for complete search history.

(56) References Cited

U.S. PATENT DOCUMENTS

| | | | |
|---|---|---|---|
| 4,277,834 | A | 7/1981 | Garibotto |
| 4,321,675 | A | 3/1982 | Harris et al. |
| 4,875,166 | A | 10/1989 | Carroll et al. |
| 5,050,130 | A | 9/1991 | Rector et al. |
| 5,138,584 | A | 8/1992 | Hale |
| 5,173,879 | A | 12/1992 | Cung et al. |
| 5,243,563 | A | 9/1993 | Kim |
| 5,500,832 | A | 3/1996 | Berryhill |
| H1529 | H | 5/1996 | Schneider, Jr. et al. |

(Continued)

FOREIGN PATENT DOCUMENTS

CN   1797037   11/2007
(Continued)

OTHER PUBLICATIONS

Berryhill, J.R. (1979), "Wave-equation datuming", Geophysics, v. 44, No. 8, pp. 1329-1344.

(Continued)

*Primary Examiner* — Carol Tsai
(74) *Attorney, Agent, or Firm* — ExxonMobil Upstream Research Co. Law Dept.

(57) ABSTRACT

A geophysical model of a subsurface region is generated based on seismic data, e.g., seismic reflection data. Migration and seismic inversion are applied to the seismic data to generate estimates of one or more physical or seismic properties of the subsurface region. Seismic inversion, such as spectral shaping inversion, is applied before or after migrating the seismic data through a variety of techniques that each avoid the amplification of dipping energy while optimizing computational efficiency and/or accuracy.

18 Claims, 18 Drawing Sheets

U.S. PATENT DOCUMENTS

| | | | |
|---|---|---|---|
| 5,583,825 | A | 12/1996 | Carrazzone et al. |
| 5,677,893 | A | 10/1997 | De Hoop et al. |
| 5,764,514 | A | 6/1998 | Raynaud et al. |
| 5,838,634 | A | 11/1998 | Jones et al. |
| 5,852,588 | A * | 12/1998 | de Hoop et al. .......... 367/38 |
| 6,002,642 | A | 12/1999 | Krebs |
| 6,038,197 | A | 3/2000 | Sitton et al. |
| 6,088,656 | A | 7/2000 | Ramakrishnan et al. |
| 6,094,400 | A | 7/2000 | Ikelle |
| 6,278,948 | B1 | 8/2001 | Jorgensen et al. |
| 6,424,918 | B1 | 7/2002 | Jorgensen et al. |
| 6,430,507 | B1 | 8/2002 | Jorgensen et al. |
| 6,446,007 | B1 | 9/2002 | Finn et al. |
| 6,473,696 | B1 | 10/2002 | Onyia et al. |
| 6,477,467 | B1 | 11/2002 | Sitton et al. |
| 6,480,790 | B1 | 11/2002 | Calvert et al. |
| 6,493,636 | B1 | 12/2002 | DeKok |
| 6,502,037 | B1 | 12/2002 | Jorgensen et al. |
| 6,591,193 | B2 | 7/2003 | Krebs et al. |
| 6,640,190 | B2 | 10/2003 | Nickel |
| 6,646,437 | B1 | 11/2003 | Chitale et al. |
| 6,651,006 | B1 | 11/2003 | Trappe et al. |
| 6,665,615 | B2 | 12/2003 | Van Riel et al. |
| 6,675,097 | B2 | 1/2004 | Routh et al. |
| 6,745,129 | B1 | 6/2004 | Li et al. |
| 6,745,156 | B2 | 6/2004 | Cook |
| 6,751,558 | B2 | 6/2004 | Huffman et al. |
| 6,807,489 | B2 | 10/2004 | Naville et al. |
| 6,829,538 | B2 | 12/2004 | de Kok |
| 6,836,448 | B2 | 12/2004 | Robertsson et al. |
| 6,876,928 | B2 | 4/2005 | Van Riel et al. |
| 6,901,333 | B2 | 5/2005 | Van Riel et al. |
| 6,903,999 | B2 | 6/2005 | Curtis et al. |
| 6,904,367 | B2 | 6/2005 | Cook et al. |
| 6,952,649 | B2 | 10/2005 | Cook et al. |
| 6,977,866 | B2 | 12/2005 | Huffman et al. |
| 6,982,927 | B2 | 1/2006 | Taner |
| 6,988,056 | B2 | 1/2006 | Cook |
| 6,993,433 | B2 | 1/2006 | Chavarria et al. |
| 7,039,526 | B2 * | 5/2006 | Kelly .......... 702/14 |
| 7,065,004 | B2 | 6/2006 | Jiao et al. |
| 7,079,591 | B2 | 7/2006 | Fling et al. |
| 7,082,368 | B2 | 7/2006 | Nickel |
| 7,167,414 | B2 | 1/2007 | Lee et al. |
| 7,177,765 | B1 | 2/2007 | Berge |
| 7,184,938 | B1 | 2/2007 | Lansford et al. |
| 7,221,774 | B2 | 5/2007 | Fletcher |
| 7,254,091 | B1 | 8/2007 | Gunning et al. |
| 7,349,807 | B2 | 3/2008 | Moos et al. |
| 7,388,808 | B2 * | 6/2008 | Lee et al. .......... 367/50 |
| 7,405,997 | B2 | 7/2008 | Baumel et al. |
| 7,406,002 | B2 | 7/2008 | Schleisiek et al. |
| 7,519,477 | B2 | 4/2009 | Glinsky et al. |
| 7,660,200 | B2 | 2/2010 | Tang |
| 7,698,065 | B2 | 4/2010 | Moos et al. |
| 2004/0122596 | A1 | 6/2004 | Sudhakar et al. |
| 2005/0090986 | A1 | 4/2005 | Van Riel et al. |
| 2006/0034153 | A1 * | 2/2006 | Meunier et al. .......... 367/57 |
| 2006/0062083 | A1 | 3/2006 | Lee et al. |
| 2006/0155475 | A1 * | 7/2006 | Yin .......... 702/14 |
| 2006/0190180 | A1 | 8/2006 | Cook |
| 2007/0021951 | A1 | 1/2007 | Lee Seislink |
| 2007/0036030 | A1 | 2/2007 | Baumel et al. |
| 2007/0276639 | A1 | 11/2007 | Montaron et al. |
| 2007/0280050 | A1 | 12/2007 | Volterrani |
| 2008/0195358 | A1 | 8/2008 | El Ouair et al. |
| 2008/0232196 | A1 | 9/2008 | Baumel et al. |
| 2010/0027376 | A1 * | 2/2010 | Washbourne et al. .......... 367/25 |

FOREIGN PATENT DOCUMENTS

| | | |
|---|---|---|
| EP | 0 864 882 | 7/2003 |

OTHER PUBLICATIONS

Berryhill, J.R. (1984), "Wave-equation datuming before stack", Geophysics, v. 49, No. 11, pp. 2064-2066.

Berryhill, J.R. (1986), "Submarine canyons: Velocity replacement by wave-equation datuming before stack", Geophysics, v. 51, No. 78, pp. 1572-1579.

Berkhout, A.J. (1986), "Seismic Inversion in Terms of Pre-Stack Migration and Multiple Elimination", Proceedings of the IEEE 1986, v. 74, No. 3, XP002498172, pp. 415-427.

Faye, J.P. et al. (1987), "Wave Field Datuming for Land Prestack Migration", Seismic 3—Statics and Velocity Analysis 2, pp. 450-453.

Fomel, S. (2007), "Shaping regularization in geophysical-estimation problems", Geophysics, v. 72, No. 2, pp. R29-R36.

Hanitzsch, C. et al. (2001), "Efficient amplitude-preserved prestack depth migration", EAGE 63$^{rd}$ Conf. & Tech. Exh., Amsterdam, The Netherlands, Jun. 11-15, 2001, pp. 1-4.

Keighley, D.J. (2006), "P-Wave Time-Lapse Seismic Data Intrepretation at Rulison Field, Piceance Basin, Colorado", Thesis, pp. 1-50.

Keighley, D.J. (2006), "P-Wave Time-Lapse Seismic Data Intrepretation at Rulison Field, Piceance Basin, Colorado", Thesis, pp. 51-111.

Kim, Y.C. et al. (1997), "Hybrid migration: A Cost-effective 3-D depth-imaging technique", Geophysics, v. 62, No. 2, pp. 568-576.

Lancaster, S. et al. (2000), "Fast-track "coloured" inversion", SEG 2000 Expanded Abstracts, 4 pgs.

Lazaratos, S. (2006), "Spectral shaping inversion for elastic and rock property estimation", Research Disclosure, Nov. 2006, pp. 1452-1455.

Levin, S.A. (1998), "Resolution in seismic imaging: Is it all a matter of perspective?", Geophysics, v. 63, No. 2, pp. 743-749.

McHugo, S. et al. (2005), "Calibrated seismic measurements for improved reservoir definition: a UKCS case study", First Break, v. 23, pp. 63-68.

Rickett, J. et al., "A cross-equalization processing flow for off-the-shelf 4D seismic data", 4 pgs.

Sava, P. et al. (2001), "Amplitude-preserved wave-equation migration", Standford Exploration Project, Report 108, Apr. 29, 2001, pp. 1-26.

Toxopeus, G. et al. (2008), "Simulating migrated and inverted seismic data by filtering a geologic model", Geophysics, v. 73, No. 2, pp. T1-T10.

Tygel, M. et al. (1994), "Pulse distortion in depth migration", Geophysics, v. 59, No. 10, pp. 1561-1569.

Veeken, P.C.H. et al. (2004), "Seismic inversion methods and some of their constraints", First Break, v. 22, XP 002498173, pp. 47-70.

*European Search Report*, dated Nov. 14, 2008.

*International Search Report and Written Opinion*, dated Feb. 12, 2009.

* cited by examiner

502 ↘

Migration Impulse Response: Shaping After Migration

502A

Steeply dipping flanks become abnormally strong

Anything steeply dipping (signal or noise) will be excessively amplified

503 ↘

Migration Impulse Response: Shaping Before Migration

503A

SPECTRAL SHAPING INVERSION AND MIGRATION OF SEISMIC DATA

CROSS-REFERENCE TO RELATED APPLICATION

This application is the National Stage entry under 35 U.S.C. 371 of PCT/US2008/085674 that published as WO 2009/088602 and was filed on 5 Dec. 2008, which claims the benefit of U.S. Provisional Application No. 61/010,407, filed on 8 Jan. 2008, which is incorporated by reference, in its entirety, for all purposes.

TECHNICAL FIELD

This description relates generally to the field of geophysical exploration. Specifically, this description relates to seismic reflection imaging based on inversion and migration to estimate subsurface physical properties, e.g., impedance, and/or to generate geophysical models of a subsurface region(s).

BACKGROUND

Relationships among seismic, electrical and reservoir properties are often exploited in geophysical exploration to model geophysical properties of subsurface regions, e.g., where data from seismic and/or electromagnetic surveys are used to predict a range of features of a subsurface region. The predicted geophysical features are then used for various exploration decisions, e.g., the number of wells to drill, the type of well(s) to drill, and optimal well location to recover resource(s) from a reservoir.

Seismic properties of a subsurface region are those properties that directly determine the reflection and transmission of seismic waves by the subsurface, and together define at least the compressional wave velocity, shear wave velocity, and density of the subsurface region. It is often more convenient to express the seismic properties of a subsurface in terms of elastic properties, such as bulk modulus and shear modulus (also called the elastic moduli). Various functions of the velocities and density of the subsurface can also be equivalently used to express seismic properties, including: bulk modulus, Poisson's ratio, Vp/Vs ratio, P-wave modulus, impedance, and Lamé parameters. Seismic properties may also include, for example, anisotropy and attenuation. Seismic wave velocities may also vary with the frequency of the seismic wave, a phenomenon called dispersion.

Among the seismic properties, impedance is the product of seismic velocity and the density. Impedance, also called acoustic impedance and often symbolized by $I_P$, will typically vary among different rock layers, e.g., opposing sides of an interface will have different impedances. The reflection coefficient of an interface generally depends on the contrast in acoustic impedance of the rock on either side of the interface. Specifically, the difference in acoustic impedance between rock layers affects the reflection coefficient. One geophysical modeling process for determining the impedance structure of a subsurface region based on recorded seismic reflection data is seismic inversion.

Seismic inversion techniques rely upon seismic reflection data, typically obtained through a seismic survey and analysis of the seismic data from the survey. Seismic reflection techniques are typically based on the generation of seismic waves in the earth's surface, through the use of one or more seismic sources, e.g., dynamite, air guns, vibrators, and the recording and analysis of the portions of these waves that get reflected at the boundaries between the earth's layers. FIGS. 1A-1B are views of convolutional models for seismograms generated from primary reflections at one or more boundaries between two or more media. Referring to FIG. 1A, a single boundary model 100 shows that at a given boundary between two media, the amplitude (strength) of the reflected wave is proportional to the amplitude of the incident wave and a quantity called a reflection coefficient. The value of the reflection coefficient depends on the elastic parameters of the two media, and for normal incidence it is given by equation (1). The seismic trace for this case contains a single pulse, whose shape is that of the seismic wavelet.

The reflection coefficient, for normal incidence (rays perpendicular to the reflecting interface), is defined as:

$$R=(I_{P2}-I_{P1})/(I_{P2}+I_{P1}) \quad (1)$$

In equation (1), R is the reflection coefficient and the quantities $I_{P1}$ and $I_{P2}$ are called compressional impedances.

The terms P-impedance and acoustic impedance are also commonly used to describe the same quantities. For example, compressional impedance is defined as the product of density and compressional (P-wave) velocity:

$$I_P=\rho V_P \quad (2)$$

In this equation $\rho$ is density and $V_P$ is the P-wave velocity. In equation (1), $I_{P1}$ and $I_{P2}$ are the compressional impedances of the layers above and below the reflective interface, respectively. For a large number of reflecting boundaries, the recorded seismic reflection response is the sum of the responses for the different boundaries.

Referring to FIG. 1B, the multiple boundary model 150 shows that a reflection event is typically recorded on every seismic trace at any given time. The recorded seismogram for the multiple boundary reflection configuration can then be thought of as a reflectivity time series, e.g., that is symbolized by r(t) and based on an impedance profile $I_P(t)$. If multiple reflections are ignored, and the pulse generated by the seismic acquisition system is a simple spike, the recorded seismic trace is composed of a sequence of reflectivity spikes, with the size of each of them calculated based on equations (1) and (2).

However, the incident seismic wave is typically not a simple spike, but a broader waveform, called the seismic wavelet w(t). In this case, the recorded seismogram is not be r(t). Instead, every spike is replaced by an appropriately scaled version of the seismic wavelet, and the results added. When the reflecting medium contains multiple reflecting boundaries, the resulting seismic trace is further evaluated by calculating the convolution of the seismic wavelet and the reflectivity time series. The reflectivity time series is a sequence of spikes, each of them generated by a single boundary, according to equation (1). The mathematical operation that combines the reflectivity time series r(t) and the wavelet w(t) in the manner just described is convolution:

$$s(t)=r(t)*w(t) \quad (3)$$

where the symbol * denotes the operation of convolution in equation (3). In equation (3), the recorded seismogram s(t) is calculated as the convolution of the reflectivity series r(t) and the wavelet w(t). Equation (3) expresses what is typically referred to as the convolutional model of reflection seismology.

Assuming continuous recording of seismic reflections, the equation for calculating the normal-incidence reflection coefficient (equation (1)), can be generalized to the following expression:

$$r(t)=(dI_P(t)/dt)/(2I_P(t)) \quad (4)$$

In equation (4), $I_P(t)$ represents the impedance value for a layer at a depth such that the reflection from the layer is recorded at a time t. The operator d/dt represents the derivative with respect to time. An exemplary seismic inversion problem from normal-incidence seismic data amounts to solving equations (3) and (4) to determine the impedance function $I_P(t)$, and assuming knowledge of the recorded seismic data s(t) and the seismic wavelet w(t). In the limit when the time interval between recorded spikes is very small, one can consider the reflectivity series as a continuous function of time, whose relationship to impedance, for normal incidence, is given by equation (4). For non-normal incidence the calculation of the reflection coefficients is modified, but the convolutional model, as described here for primary reflections only, remains valid.

Estimation of the seismic wavelet w(t) can be achieved by making use of well log data. When a well is available and appropriate sonic and density well logs have been collected, the impedance $I_P(t)$ and reflectivity r(t) are known. Equation (3) can then be used to solve for w(t), given r(t) and the seismic trace s(t). For this estimation to work adequately, an accurate correlation usually needs to be established between subsurface information at the well and the seismic events. The term "well tie" is commonly used to describe the process of establishing this correlation. Accordingly, accurate well ties are a prerequisite for most inversion methods.

The aforementioned concepts can also be generalized to the case where the recorded reflections correspond to larger angles between the incident and reflected wave propagation paths, e.g., oblique or non-normal incidence case. For such situations the convolutional model equation (3) is still valid, but the expression for the reflection coefficient equation (4) is replaced with a more complicated expression, e.g., containing additional elastic parameters, such as shear-wave velocity.

Various seismic inversion techniques based on the convolutional models have been applied in common practice. Two recently developed seismic inversion techniques that are implemented as simple modifications of the frequency spectrum are Coloured inversion and Spectral Shaping inversion. These seismic inversion techniques are further described in Lancaster, S., and Whitcombe, D., 2000, "Fast Track 'Coloured' Inversion," Expanded Abstracts, 70th SEG Annual Meeting, Calgary, 1572-1575; and Lazaratos, S., 2006, "Spectral Shaping Inversion For Elastic And Rock Property Estimation," Research Disclosure, Issue 511, November 2006.

Referring to FIG. 2, while the two techniques differ in their implementation, both inversion techniques are similar conceptually. For example, impedance estimation is performed by the combination of a phase rotation (−90°) and a spectral shaping operation applied to seismic data. Prior to the application of the phase rotation and the spectral shaping operation, the seismic data is typically converted to zero-phase, e.g., for zero-phase data all frequency components of the seismic wavelet are synchronized and combined to produce a wavelet that is symmetric around the wavelet peak. Coloured inversion assumes a log amplitude spectra follows an exponential law, while spectral shaping inversion (Lazaratos) does not require this assumption. In addition, coloured inversion is strictly a zero-offset inversion. Spectral shaping inversion also provides added benefits of being useful in generating estimates of both elastic and rock properties.

The spectral shaping operation is implemented by the application of a filter that reshapes the original seismic spectrum to make the seismic spectrum similar to the average spectrum of well logs recorded at wells in the subsurface region. Referring to FIG. 2, a graphical view 200 demonstrates how the spectral shaping filters significantly amplify the energy in the low-frequency part of the seismic spectrum. Average local well log 220 and original seismic frequency 240 spectra are significantly different even over the range of frequencies for which the signal-to-noise ratio of the data is positive. Spectral shaping reshapes the original spectrum to make it similar to the log spectrum. The resulting frequency spectrum is the shaped seismic spectrum 260. The shaping operation implies significant amplification of the low-frequency energy, as seen in FIG. 2.

Lazaratos [2006] provides a mathematical derivation demonstrating that, under assumptions that are commonly satisfied, the spectral shaping procedure highlighted above provides an estimate of the impedance, solving equations (3) and (4). For example, based on the convolutional model established above, a seismic trace can be expressed by the convolution equation (5):

$$s(t) = w(t) * r(t) = w(t) * \frac{\Delta I_P(t)}{2 I_P(t)} = \frac{\Delta t}{2} w(t) * \frac{1}{I_P(t)} \frac{d I_P(t)}{dt} \qquad (5)$$

In the above expression, and hereinafter, the following notation convention is used to describe one or more of the following features:

s(t), S(f) seismic trace and its Fourier transform
$S_{quad}(f)$ Fourier transform of quadrature trace
w(t), W(f) wavelet and its Fourier transform
r(t) reflectivity
$I_P(t)$, $I_P(f)$ P-impedance and its Fourier transform
$\overline{I_P}$ lowpass filtered P-impedance
$\Delta t$ the sampling rate The term $I_P(t)$ in the denominator can be replaced by a very slowly changing function, which just contains the trend in $I_P$. In practice, such a function can be generated by lowpass filtering $I_P$, to maintain frequencies at the very low end of the spectrum (e.g. 0-2 Hz). This low-frequency term can then be treated as a simple multiplier and moved to the left of the convolution operator. The convolution equation then becomes (equation (6)):

$$s(t) = \frac{\Delta t}{2} w(t) * \frac{1}{\overline{I_P}(t)} \frac{d I_P(t)}{dt} = \frac{\Delta t}{2 \overline{I_P}} w(t) * \frac{d I_P(t)}{dt} \qquad (6)$$

A weak-scattering assumption, stated as follows, is relied upon to mathematically show the ability to transform the convolution equation from its original form to the one given in equation (6). P-impedance can be decomposed into a slowly changing background part, e.g., low-frequency trend, frequencies well below the seismic bandwidth, and a higher-frequency perturbation part including changes in the seismic bandwidth and above. Accordingly, (i) the perturbation should be weak relative to the background, and (ii) the background is essentially constant within the length of the seismic wavelet. Based on numerous observations supporting these conclusions, transforming equation (6) to the frequency domain results in equation (7):

$$S_{quad}(f) = \frac{\pi \Delta t}{\overline{I_P}} f W(f) I_P(f) \qquad (7)$$

Averaging for several wells (using < > to signify the averaging operation), results in equation (8):

$$\langle S_{quad}(f) \rangle = \frac{\pi \Delta t}{I_P} fW(f)\langle I_P(f) \rangle \quad (8)$$

where it is assumed that the seismic wavelet is constant for the area within which the wells are located.

By definition, the shaping filter's frequency response is the ratio of the average log spectrum and the average seismic spectrum, as seen in equation (9):

$$\text{Shaping Filter: } H(f) = \frac{\langle I_P(f) \rangle}{\langle S_{quad}(f) \rangle} = \frac{\overline{I_P}}{\pi \Delta t} \frac{1}{fW(f)} \quad (9)$$

and applying this to the seismic data results in equation (10):

$$\text{Shaped Seismic} = H(f)S_{quad}(f) = I_P(f) \quad (10)$$

Seismic migration of seismic data is a correction technique involving rearrangement of seismic events, so that reflections are plotted at a true representation of their subsurface locations. Referring to FIG. 3, a graphical model 300 shows, on the original recorded data, reflections from dipping interfaces are recorded at surface positions that are not directly above the subsurface locations where the reflections take place. In addition, isolated point-like discontinuities in the subsurface (point scatterers) generate seismic events (diffractions) recorded over a large range of receivers, that can make the interpretation of seismic data confusing. Seismic velocity variations are one more reason the original recorded data provide only a distorted view of the subsurface geology. The seismic migration technique addresses the above issues and is therefore utilized in many seismic data processing sequences to accurately depict the structures and geometric configurations observed in seismic recordings as an analog of the geologic layers that gave rise to the seismic reflections.

The need to correctly position dipping reflectors is best seen in FIG. 3. The reflection pulse from point A generated from a source at S1 and recorded at a receiver also at S1 is plotted on the trace under S1, at point A', which is selected such that the lengths of S1A and S1A' are equal (assuming a constant-velocity subsurface for simplicity). Similarly, the reflection pulse from point B is plotted on the trace under S2, at point B'. The reflector segment AB is plotted at the erroneous lateral position A'B' and has a dip smaller than AB's true dip. Migration is the correction technique that corrects such distortions. Before migration, the structures and geometric configurations observed in seismic recordings are typically not an accurate description of the geologic layers that gave rise to the seismic reflections.

Seismic inversion has traditionally been limited to applications where seismic inversion has been applied after migration as accurate well ties are typically required to estimate the seismic wavelet. Since the original "un-migrated" data forms an inaccurate structural image of the sub-surface, accurate well ties are typically established after migration. The present inventors have determined that there is a need for a seismic inversion technique that can be applied at various stages in a modeling process while still being computationally efficient and accurate when used in conjunction with a migration correction technique to model impedance of a subsurface region.

SUMMARY

In one general aspect, a method for generating a geophysical model of a subsurface region based on seismic data includes receiving seismic data. Inversion is applied to the seismic data, e.g., the inversion process changes (shapes) the frequency spectrum of the seismic data. The inverted seismic data is then migrated.

Implementations of this aspect may include one or more of the following features. For example, receiving seismic data may include obtaining seismic reflection data. Applying inversion to the seismic data may include applying spectral shaping inversion to the seismic data. For example, spectral shaping inversion may include applying coloured inversion or Lazaratos spectral shaping inversion. The application of spectral shaping inversion to the seismic data may include applying a spectral shaping filter to an original seismic data spectrum to generate a shaped seismic data spectrum. An average frequency spectrum of available well log data and an average frequency spectrum of the seismic data may be obtained. The application of spectral shaping inversion to the seismic data may include applying a spectral shaping filter to an original seismic data spectrum to generate a shaped seismic data spectrum.

For inversion methods other than spectral shaping inversion, an estimate of the seismic wavelet may be necessary and the estimate may be obtained based on sonic and density well log data. An estimate of a seismic wavelet based on sonic and density well log data is not needed for spectral shaping inversion, and therefore may not be obtained prior to migrating the shaped seismic data. The migrated data may be stacked and/or a phase rotation may be applied to the stacked data to generate an estimate of subsurface impedance. The phase rotation may be a -90 degree phase rotation of the migrated seismic data and the estimate may be of bandlimited P-Impedance. The seismic reflection data received may be converted to zero phase prior to applying inversion, and a phase rotation may be applied to the migrated seismic data to generate an estimate of impedance.

The method may be utilized to generate an estimate(s) of one or more of the following seismic or physical properties, including bandlimited P-Impedance, bandlimited S-Impedance, Vp/Vs, bulk modulus, shear modulus, compressional wave velocity, shear wave velocity, Vp/Vs ratio, a Lamé constant, an anisotropy parameter.

In another general aspect, a method for generating a geophysical model of a subsurface region based on seismic data includes receiving migrated seismic data and demigrating the migrated data with a migration algorithm and a simple velocity model for the subsurface region. Spectral shaping inversion is applied to the demigrated seismic data. The shaped seismic data is migrated with the migration algorithm and the simple velocity model for the subsurface region.

Implementations of this aspect may include one or more of the following features. For example, the simple velocity model for the subsurface region may include a constant velocity model for the subsurface region. The migration algorithm and the simple velocity model for the subsurface region may include a constant-velocity Stolt migration model for the subsurface region. The simple velocity model for the subsurface region may include a laterally invariant model for the subsurface region. The migrated seismic data may include seismic reflection data. The seismic reflection data may be converted to zero phase prior to applying inversion, and/or a phase rotation may be applied to the migrated seismic data to generate an estimate of impedance. Spectral shaping inversion applied to the seismic data may include applying a spectral shaping filter to the demigrated seismic data spectrum to generate a shaped seismic data spectrum.

A phase rotation may be applied to the remigrated data to generate an estimate of subsurface impedance. The application of a phase rotation may include applying a −90 degree phase rotation of the migrated seismic data and the estimate may be of bandlimited P-Impedance. The seismic data may be stacked prior to and/or after inversion or migration of the data. A phase rotation may be applied to the stacked seismic data to generate an estimate of impedance.

The method may be utilized to generate an estimate(s) of one or more of the following seismic or physical properties, including generating estimates of one or more of bandlimited P-Impedance, bandlimited S-Impedance, Vp/Vs, bulk modulus, shear modulus, compressional wave velocity, shear wave velocity, Vp/Vs ratio, a Lamé constant, and an anisotropy parameter.

In another general aspect, a method for generating a geophysical model of a subsurface region based on seismic data includes receiving seismic reflection data. The seismic data is migrated. A spectral shaping inversion filter is applied to the migrated seismic reflection data. A phase rotation is applied to the stacked seismic data to generate an estimate of impedance of the subsurface region.

Implementations of this aspect may include one or more of the following features. For example, applying the spectral shaping inversion filter to the migrated seismic reflection data may include calculating a multi-dimensional spectral shaping operator, performing a multi-dimensional Fourier transform of the migrated data, multiplying the calculated multi-dimensional spectral shaping operator with the multi-dimensional Fourier transform of the migrated data, and applying a multi-dimensional inverse Fourier transform. Calculating the multi-dimensional spectral shaping operator may include a 2-D or 3-D Fourier transform.

A 2-D or 3-D Fourier transform may be performed of a migration impulse response based on the spectrum of seismic reflection data and a 2-D or 3-D Fourier transform may be performed of a migration impulse response based on the shaped spectrum of the seismic reflection data. The application of the spectral shaping inversion filter to the seismic reflection data may include demigrating the migrated seismic data with a migration algorithm and a simple velocity model for the subsurface region prior to applying spectral shaping inversion to the seismic reflection data; applying spectral shaping inversion to the demigrated seismic data; and/or remigrating the shaped seismic data with the migration algorithm and the simple velocity model for the subsurface region.

In another general aspect, a computer program product is tangibly embodied in a machine-readable storage device, the computer program product including instructions that, when executed, cause a hardware system, e.g., a display or other output device, to generate geophysical model(s) of a subsurface region based on seismic data by receiving seismic reflection data, migrating the seismic reflection data, and applying a spectral shaping inversion filter to the seismic reflection data. A phase rotation can be applied to the stacked seismic data spectrum to generate an estimate of impedance of the subsurface region. The spectral shaping inversion filter can be applied prior to migrating the seismic data. Alternatively, the spectral shaping filter can be applied after migrating the seismic data, e.g., a multi-dimensional spectral shaping operator can be calculated and multiplied with a Fourier transform of the migrated data, followed by a multi-dimensional inverse Fourier transform, and/or the migrated data can be demigrated, shaped, and then remigrated after an initial migration process.

For example, a tangible computer-readable storage medium includes, embodied thereon, a computer program configured to, when executed by a processor, generate a geophysical model of a subsurface region based on seismic data, the medium comprising one or more code segments configured to receive seismic reflection data; to migrate the seismic data; to apply a spectral shaping inversion filter to the seismic reflection data; to stack the seismic data; and to apply a phase rotation to the stacked seismic data spectrum to generate an estimate of a geophysical property of the subsurface region. The spectral shaping inversion filter is applied to reduce amplification of dipping energy by at least one of (i) applying the spectral shaping inversion filter prior to migrating the data; (ii) demigrating migrated data prior to applying the spectral shaping inversion filter and remigrating the inverted data; and (iii) calculating a multi-dimensional spectral shaping operator and multiplying the multi-dimensional spectral shaping operator with a Fourier transform of the migrated data.

In another general aspect, an exemplary hardware system for generating estimates of geophysical properties is configured to generate a geophysical model of a subsurface region based on seismic data, e.g., obtained through hydrophones and/or geophones, to receive seismic reflection data, to migrate the seismic reflection data, and to apply a spectral shaping inversion filter to the seismic reflection data. A phase rotation can be applied to the stacked seismic data spectrum to generate an estimate of impedance of the subsurface region, e.g., that may be displayed through a display component of the system. The spectral shaping inversion filter can be applied prior to migrating the seismic data. Alternatively, the spectral shaping filter can be applied after migrating the seismic data, e.g., a multi-dimensional spectral shaping operator can be calculated and multiplied with a Fourier transform of the migrated data, or the migrated data can be demigrated, shaped, and then remigrated after an initial migration process. The geophysical model can be displayed on a display component of the hardware system.

In another general aspect, a method for producing hydrocarbons from a subsurface region includes generating a geophysical model of a subsurface region based on seismic data. Generating the geophysical model further includes receiving seismic reflection data; migrating the seismic data; applying a spectral shaping inversion filter to the seismic reflection data; stacking the seismic data; and applying a phase rotation to the stacked seismic data spectrum to generate an estimate of a geophysical property of the subsurface region. The spectral shaping inversion is applied to reduce amplification of dipping energy by at least one of (i) applying the spectral shaping inversion filter prior to migrating the data; (ii) demigrating migrated data prior to applying the spectral shaping inversion filter and remigrating the inverted data; and (iii) calculating a multi-dimensional spectral shaping operator and multiplying the multi-dimensional spectral shaping operator with a Fourier transform of the migrated data. A well is drilled to a formation interpreted in the generated geophysical model as potentially hydrocarbon bearing. Hydrocarbons are produced from the well.

Figure 1A:
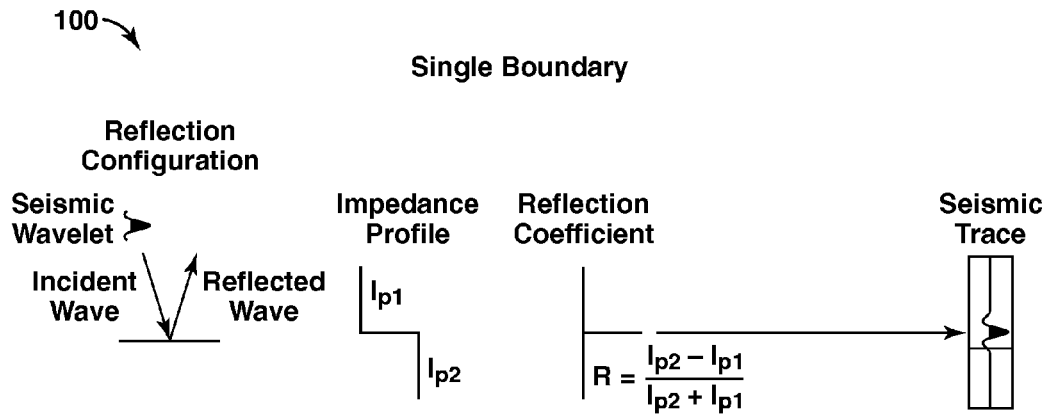
FIG. 1A is a convolutional model for a seismogram of the background art generated from a primary reflection at a single boundary between two media.
Figure 1B:
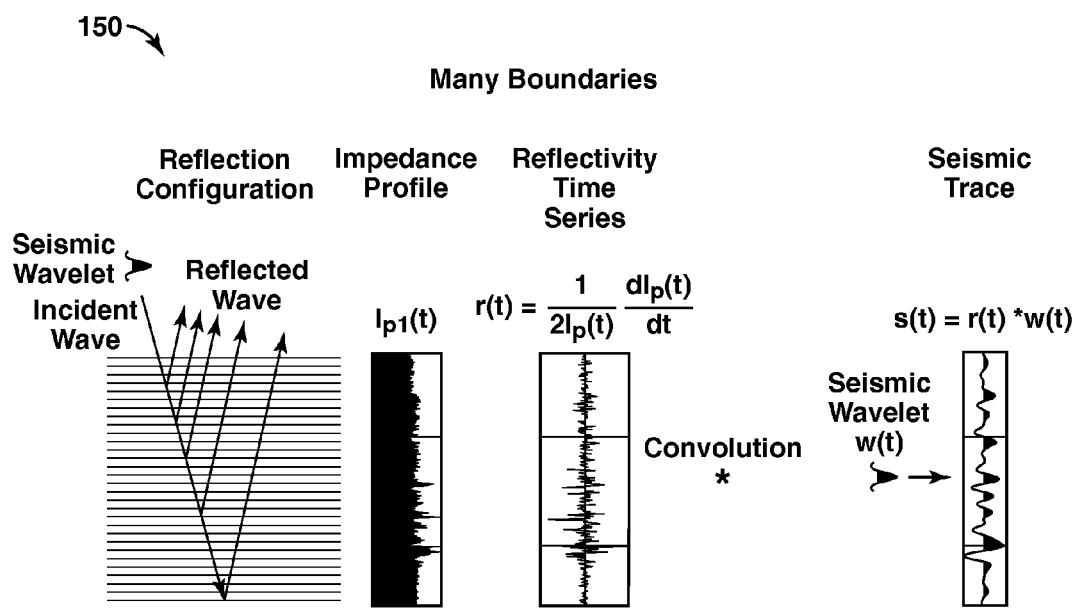
FIG. 1B is a convolutional model for a seismogram of the background art generated from primary reflections at multiple boundaries between media.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION

In one general aspect, the present inventors have determined that spectral shaping is mathematically equivalent to other methods of inversion achieving the same objective. In addition, the present inventors have also discovered various computational advantages to spectral shaping inversion which have not previously been appreciated by others utilizing traditional seismic inversion techniques. Accordingly, the behavior of spectral shaping inversion can be generalized for other types of inversion procedures, as long as these inversion procedures are based on the convolutional model. For example, one advantage of spectral shaping inversion is that, unlike other inversion methods, spectral shaping inversion does not require an estimate of the seismic wavelet w(t), and, therefore, spectral shaping inversion does not rely on accurate well ties. Therefore, knowledge of the average frequency spectrum of available well log data and the average frequency spectrum of the seismic data is sufficient for performing the inversion.

The present inventors have determined that spectral shaping inversion does not require an estimate of the seismic wavelet and, therefore, is an inversion technique that can be advantageously performed before or after migration. For example, assuming there are no other considerations, inversion techniques are typically applied after migration, for the following reasons. First, migration of large modern 3D seismic data sets is typically a very time-consuming and expensive process. Since a migrated version of the original recorded data is generally required, generating a migrated version of spectrally shaped inversion data normally adds to the cost of an additional migration run. Therefore, if an inversion technique is applied after migration, one only needs to migrate the data once. Second, any change in the design of the spectral shaping filter requires additional migration runs to generate a final product, and this further increases the cost of the process. For these reasons, the standard practice in the background art has been to apply an inversion technique, particularly spectral shaping applications, after migration correction techniques have been applied to the data.

However, as discussed further below, changing the order of application of migration and inversion techniques produces very different final results that can be utilized advantageously in various ways. In addition, the present inventors have also determined that applying a seismic inversion process that assumes a convolutional model with a single, time-independent wavelet to migrated seismic data distorts the relative amplitudes of the seismic events, e.g., artificially amplifying the steep dips.

Figure 4:
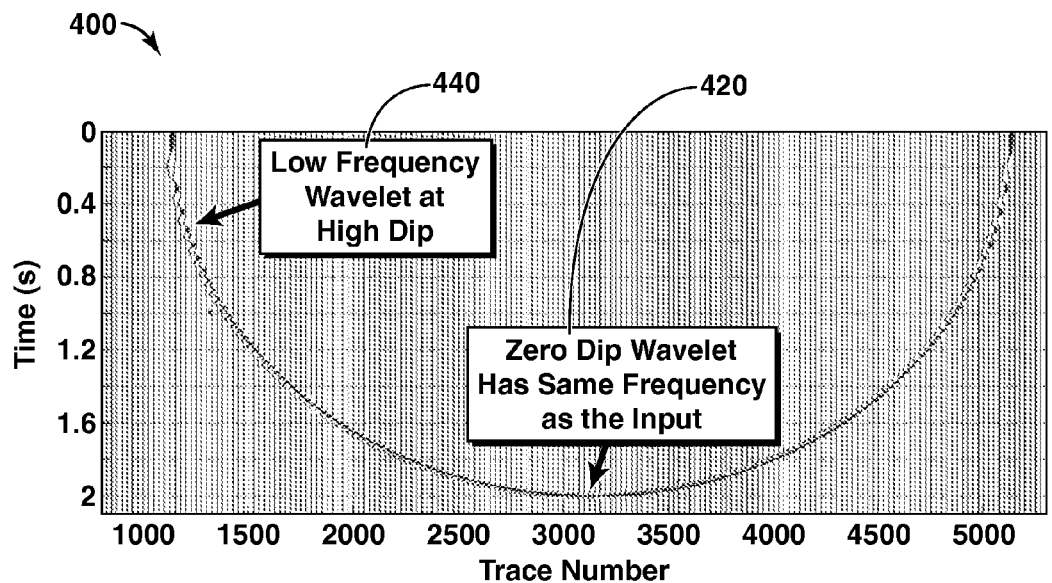
FIG. 4 is a graphical view of a migration impulse response in terms of time versus trace number.

A typical migration impulse response 400 for a constant-velocity medium in terms of time versus trace number is shown in FIG. 4. Referring to FIG. 4, the effect of inversion on the migration impulse response is useful in demonstrating the impact of applying inversion after migration. The output of the migration process is defined by impulse response 400 when the input is a localized impulse. Since the seismic data input to migration can be thought of as just a superposition of such impulses, understanding what happens to a single impulse fully characterizes the behavior of migration for any given input. As seen in FIG. 4, the wavelet is dip-dependent after migration, with lower-frequency wavelets corresponding to high dips 440. For example, the relationship seen in FIG. 4 is further described in Levin, S. A., 1998, "Resolution In Seismic Imaging: Is It All A Matter Of Perspective?," Geophysics, 63, 743-749; and Tygel, M., Schleicher, J., and Hubral, P., 1994, "Pulse Distortion in Depth Migration: Geophysics," 59, 1561-1569. A zero-dip wavelet 420 has the same frequency as the input.

Despite the fact that it has been appreciated that migration distorts the seismic wavelet, the implications for seismic inversion have not been fully understood. Since the wavelet is dip-dependent after migration, the convolutional model (equation (3)) is generally not valid after migration, e.g., equation (3) assumes a dip-independent wavelet. The present inventors have determined that the consequences of ignoring this fact affects inversion algorithms applied after migration, and are described in greater detail hereinafter.

Figure 5A:
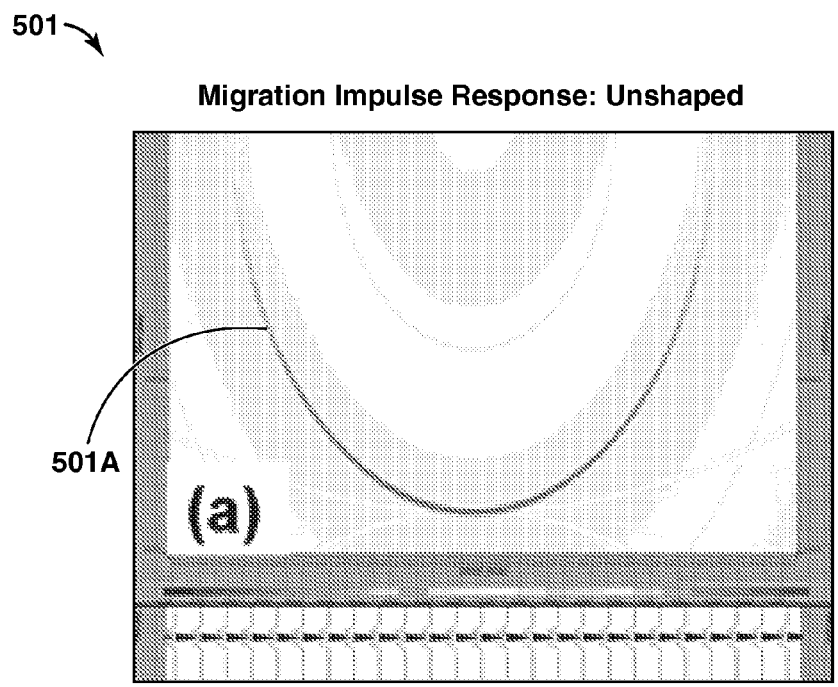
FIG. 5A is a view of an unshaped migration impulse response for a bandlimited wavelet without spectral shaping.
Figure 5B:
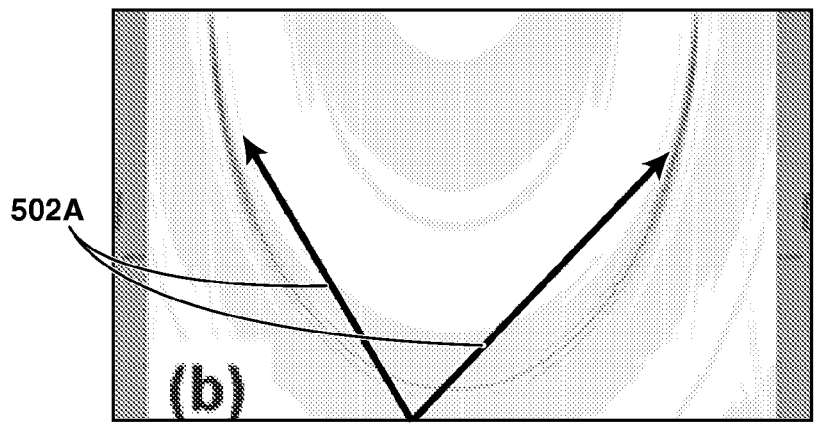
FIG. 5B is a view of a result achieved by applying a spectral shaping filter to the migration impulse response of FIG. 5A.
Figure 5C:
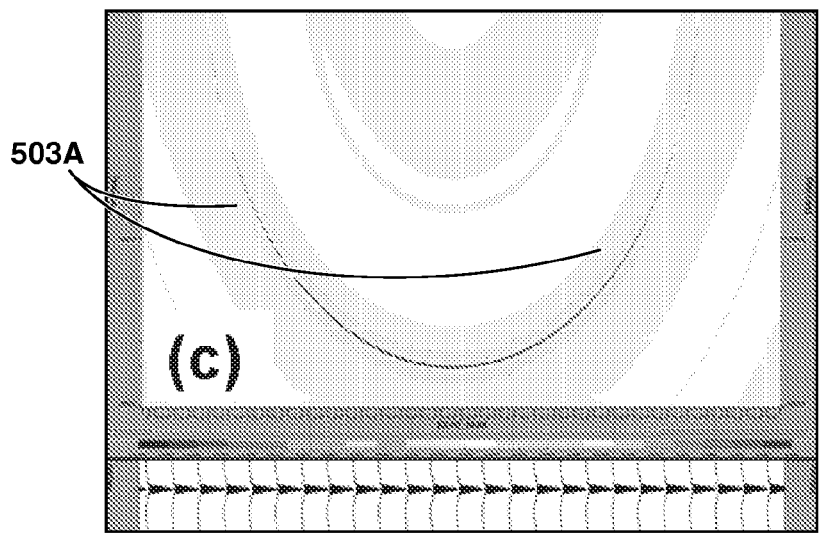
FIG. 5C is a view of a result achieved by applying the spectral shaping filter to an input pulse which generated the impulse response of FIG. 5A and migrating the shaped input pulse.

FIG. 5A is a view of an unshaped migration impulse response 501A for a bandlimited wavelet without spectral shaping. FIG. 5B is a view of a result achieved by applying a spectral shaping filter to the migration impulse response of FIG. 5A. FIG. 5C is a view of a result achieved by applying the spectral shaping filter to an input pulse which generated the impulse response of FIG. 5A, and migrating the shaped input pulse. Referring to FIGS. 5A and 5B, a migration impulse response before 501 and after 502 the application of a spectral shaping filter is shown, e.g., a spectral shaping filter typically applied in Coloured or Spectral Shaping inversion. The impulse response 502 exhibits large amplification of the steeply-dipping flanks 502A, e.g., compared to original response 501A. As described with respect to FIG. 2, the spectral shaping filters used for inversion significantly amplify the energy in the low-frequency part of the seismic spectrum. However, the fact that the steeply-dipping parts of the impulse response have lower-frequency wavelets than the flatter parts is not a result of spectral shaping. As discussed in greater detail hereinafter, the steeply-dipping parts of the migration impulse response have lower-frequency wavelets than the flatter parts. The consequence of the behavior observed here is that application of spectral shaping after migration causes steeply-dipping energy, signal or noise, to be excessively amplified.

However, referring to FIG. 5C, the present inventors have determined that applying the same spectral shaping filter, and then migrating, leads to an impulse response 503 with correctly-preserved relative amplitudes between the flat and steeply-dipping parts 503A. Accordingly, the relative amplitude variation along the impulse response in FIG. 5C is very similar to that of FIG. 5A, while the relative amplitude variation seen in FIG. 5B has significantly changed.

Figure 6A:
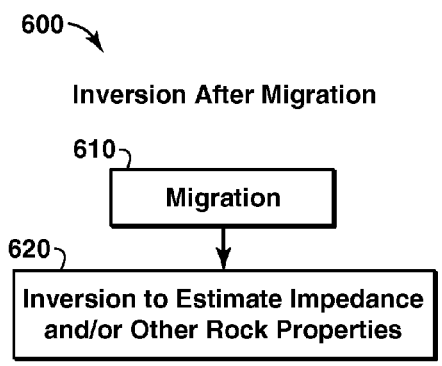
FIG. 6A is a flowchart of a process for estimating a physical property of a subsurface which includes migration and inversion.
Figure 6B:
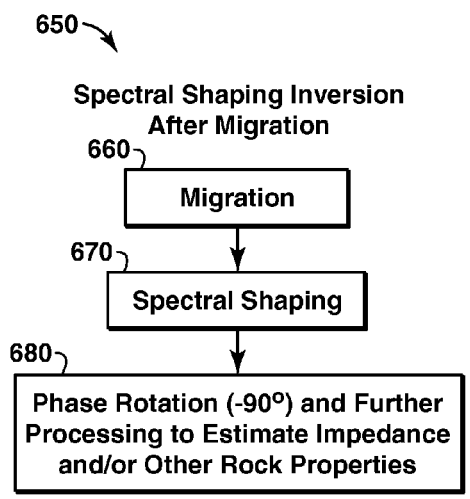
FIG. 6B is a flowchart of a process for estimating a physical property of a subsurface based on spectral shaping inversion applied after migration.

FIGS. 6A-6B are flowcharts of processes for estimating a physical property of a subsurface which include migration correction techniques and inversion. Specifically, the generalized flowcharts depict two inversion practices 600, 650. Referring to FIG. 6A, an inversion step 620 is applied after a migration step 610 in process 600. The inversion process 620 is typically applied to the migrated data to generate an estimate of subsurface impedance, and/or one or more other seismic or physical properties, such as the compressional wave velocity, shear wave velocity, density of the subsurface region, bulk modulus, and/or shear modulus (also called the elastic moduli). Alternatively, or in addition to, the processes 600, 650 may be used to generate estimates of one or more of bandlimited P-Impedance, bandlimited S-Impedance, Vp/Vs, bulk modulus, shear modulus, compressional wave velocity, shear wave velocity, Vp/Vs ratio, a Lamé constant, and an anisotropy parameter.

Referring to FIG. 6B, a spectral shaping inversion step 670 is applied after a migration step 660 in process 650. In addition, a phase rotation, e.g., −90°, is applied to the shaped and migrated data in step 680 to generate an estimate of the subsurface impedance and/or one or more other seismic or physical properties. An exemplary process may contain several additional processing steps, but in both processes 600, 650, inversion 620, 670 has been applied after migration. As discussed above, current inversion practice can be summarized, at a very general level, by the flowchart of FIG. 6A, showing migration 610 followed by inversion 620 to estimate impedance and/or other rock properties. In process 650, a spectral shaping inversion step 670, such as applying a spectral shaping filter (Lazaratos) or Coloured inversion previously described, is applied to the migrated data 660. Referring to FIG. 6B, spectral shaping 670 is typically applied after migration 660, followed by a −90° phase rotation 680 and/or further processing to estimate impedance and/or other rock properties, e.g. as outlined by Lazaratos (2006).

However, the present inventors have determined that current approaches, such as process 600, 650, ignore the dip-dependence of the wavelet after migration, and, as a consequence, excessively amplify steeply-dipping energy, signal or noise. Accordingly, the present inventors have developed a technique for performing seismic inversion that avoid the amplification of dipping energy while optimizing computational efficiency and/or accuracy.

Figure 7:
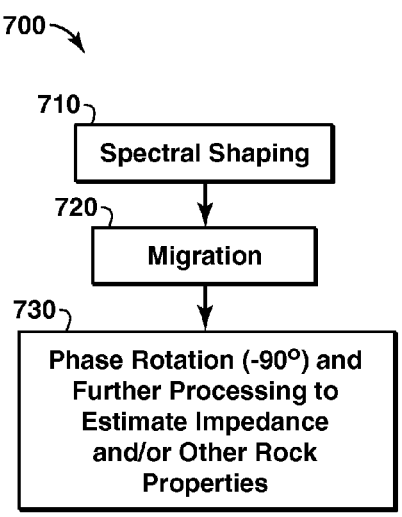
FIG. 7 is a flowchart of a process for estimating a physical property of a subsurface based on applying spectral shaping inversion prior to migration.

FIG. 7 is a flowchart of a process for estimating a physical property of a subsurface based on applying spectral shaping inversion prior to migration. Referring to FIG. 7, a first process 700 for performing seismic inversion relative to migration includes applying spectral shaping inversion 710 to seismic data, followed by migrating the shaped data 720, and additional processing step(s) 730, e.g., applying a phase rotation of −90° to estimate subsurface impedance and/or other seismic and physical properties. Another optional step may include stacking the data prior to, after, or concurrent with one or more of the other steps of process 700. Although a typical seismic processing workflow may, in general, contain several additional processing steps, process 700 is particularly advantageous if the inversion 710 is performed before the migration 720.

The present inventors have determined that the application of a spectral shaping filter, e.g., Lazaratos spectral shaping inversion or Coloured inversion, before migration, further optimizes results. Unlike other inversion techniques that typically require an estimate of the seismic wavelet, e.g., usually obtained through a well tie, an estimate of the seismic data spectrum is all that is needed for spectral shaping. Further, the estimate of the seismic data spectrum can be obtained reliably even when the geometric configurations of the recorded reflectors are inaccurately imaged, e.g., as the geometric configurations may be prior to any correction, e.g., through migration 720. Any problems associated with amplification of steeply-dipping energy are reduced and/or eliminated if the seismic wavelet is independent of reflector dip before migration 720.

After spectral shaping 710 and migration 720, a −90° phase rotation is applied and/or additional processing is applied. For example, Lazaratos (2006) describes additional processing techniques and/or properties that may be applied or determined in combination with a spectral shaping inversion technique. Alternatively, or in addition, one of ordinary skill in the art will appreciate that one or more standard seismic processing steps may be applied before and/or after spectral shaping and migration. For example, other processing techniques may include one or more of the following processes, such as a de-signature process, de-ghosting process, random noise attenuation, multiple attenuation, a deconvolution process, and/or estimation of stacking and migration velocities. With respect to migration 720, the process 700 exhibits favorable results across a wide range of migration algorithms, and the process 700 is therefore not limited to any particular migration technique.

As discussed earlier, seismic inversion, particularly spectral shaping, is routinely applied after migration in current practice. Specifically, inversion is typically applied after migration to avoid multiple data runs of the time-consuming migration process. However, the present inventors have determined that the accepted practice of applying inversion after migration can result in one or more limitations. Specifically, as described with respect to FIGS. 5A-5C and 6A-6B, current geophysical techniques ignore the dip-dependence of the wavelet after migration, and, as a consequence, excessively amplify steeply-dipping energy, signal and/or noise. Accordingly, the process 700 described in connection with FIG. 7, reverses the order of spectral shaping inversion and migration in a manner that increases the ability of the overall process to estimate subsurface properties, e.g., such as impedance.

Figure 8:
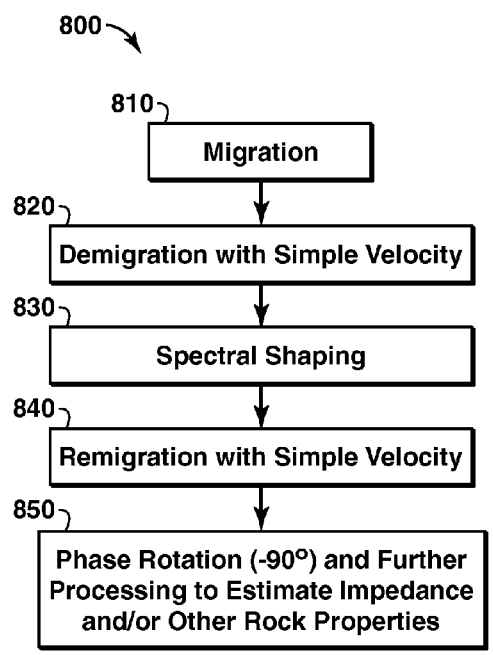
FIG. 8 is a flowchart of a process for estimating a physical property of a subsurface based on migration, de-migration with a simple velocity model, spectral shaping inversion, and re-migration with the simple velocity model.

FIG. 8 is a flowchart of a process 800 for estimating a physical property of a subsurface based on migration, demigration with a simple velocity model, spectral shaping inversion, and remigration with the simple velocity model. Alternative process 800 also addresses the dip-dependence of the wavelet after migration, and therefore does not excessively amplify steeply-dipping energy, e.g., signal and/or noise. In process 800, seismic data is first migrated 810. After migration 810, a demigration technique 820, spectral shaping inversion technique 830, and remigration technique 840 are applied to the previously migrated data 810. In addition, phase rotation and/or other computational and/or imaging processes 850 may be applied after the demigration 820, shaping 830, and remigration 840 techniques are applied. In contrast to process 700, which applies spectral shaping before migration to achieve highly accurate results, process 800 provides a way of improving the accuracy of current processing techniques while offering an alternative technique which is less computational intensive than process 700. Specifically, process 700 may be considered impractical for some applications as an additional migration of the seismic data set is typically required. For example, if a migrated version of the original unshaped recorded data is always required, one would have to migrate the original data set, and also shape the data set and migrate the shaped data set again. In process 800, a substantially equivalent result is achieved at a small fraction of the computational load and cost of an additional migration.

Process 800 includes demigrating 820 the migrated input data, e.g., using a relatively fast and inexpensive migration technique. For example, a migration technique that assumes an extremely simple velocity model, e.g., constant-velocity Stolt migration, or a laterally invariant model, will typically produce a fast and inexpensive migration technique. The publication "Migration By Fourier Transform: Geophysics," 43, 23-48, by Stolt, R. H., 1978, further describes an exemplary Stolt migration. Specifically, demigration is the inverse of migration. Therefore, a demigration process receives a migrated version of a seismic data set as an input, and outputs a close approximation of the original data set. In addition, the process of demigration is well understood for several classes of migration algorithms, e.g., including the Stolt migration mentioned earlier.

The cost of migration and demigration algorithms largely depends on the velocity model used, e.g., with simple models leading to relatively fast computation times and reduced costs. A velocity model is a model of the subsurface under investigation, in which values representing the velocity of propagation of seismic waves are assigned at different locations across the region. Accordingly, a simple model, e.g., constant velocity or a laterally invariant model, applies a velocity model with relatively isotropic velocity values across the subsurface region. In step 830, a spectral shaping filter is applied to the demigrated data. In step 840, the spectrally shaped and demigrated data is remigrated, using the same migration algorithm and velocity model used in the demigration step 820. Accordingly, if a Stolt migration algorithm and constant velocity model were used in step 820, the data is remigrated after shaping with the Stolt migration algorithm and constant velocity model.

The demigration/shaping/remigration process 800 generates a result that is a very close approximation to the estimate, e.g., subsurface impedance, achieved in process 700. Even if the migration velocity used for the demigration and remigration processes are significantly different from the true earth velocity across the actual region, the present inventors have determined that process 800 demonstrates favorable accuracy coupled with computational efficiency. Therefore, the technique of demigration/shaping/remigration process 800, produces an enhancement over the prior practice of applying a spectral shaping operation after migration, e.g., even when performed with a velocity model which has previously been regarded being a relatively inaccurate and/or simple velocity model, e.g., a constant velocity model.

Figure 9A:
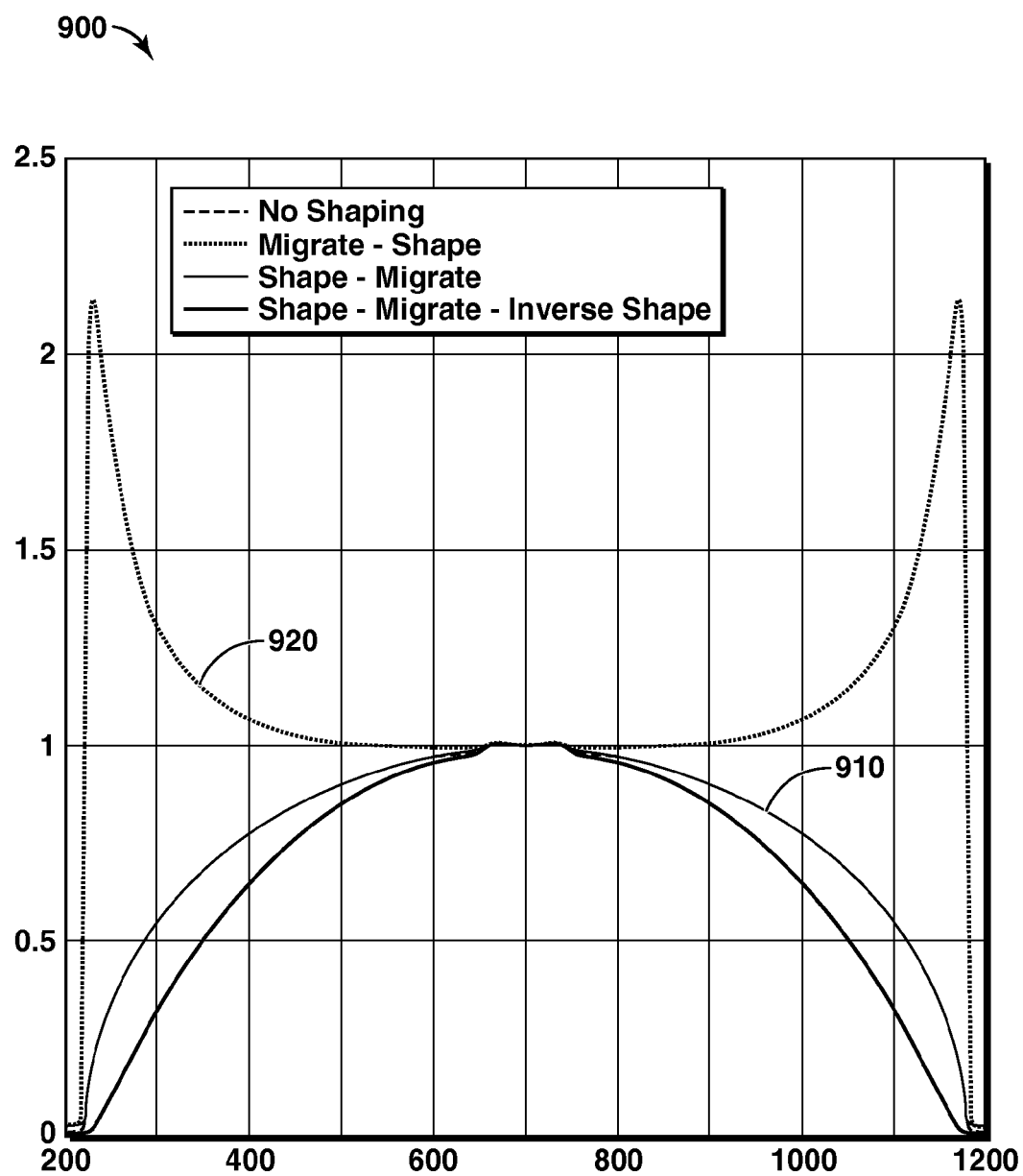
FIG. 9A is a graphical view showing a correct relative amplitude variation along the migration impulse response of FIG. 5A and a relative amplitude variation along the migration impulse response of FIG. 5B (spectral shaping post-migration).
Figure 9B:
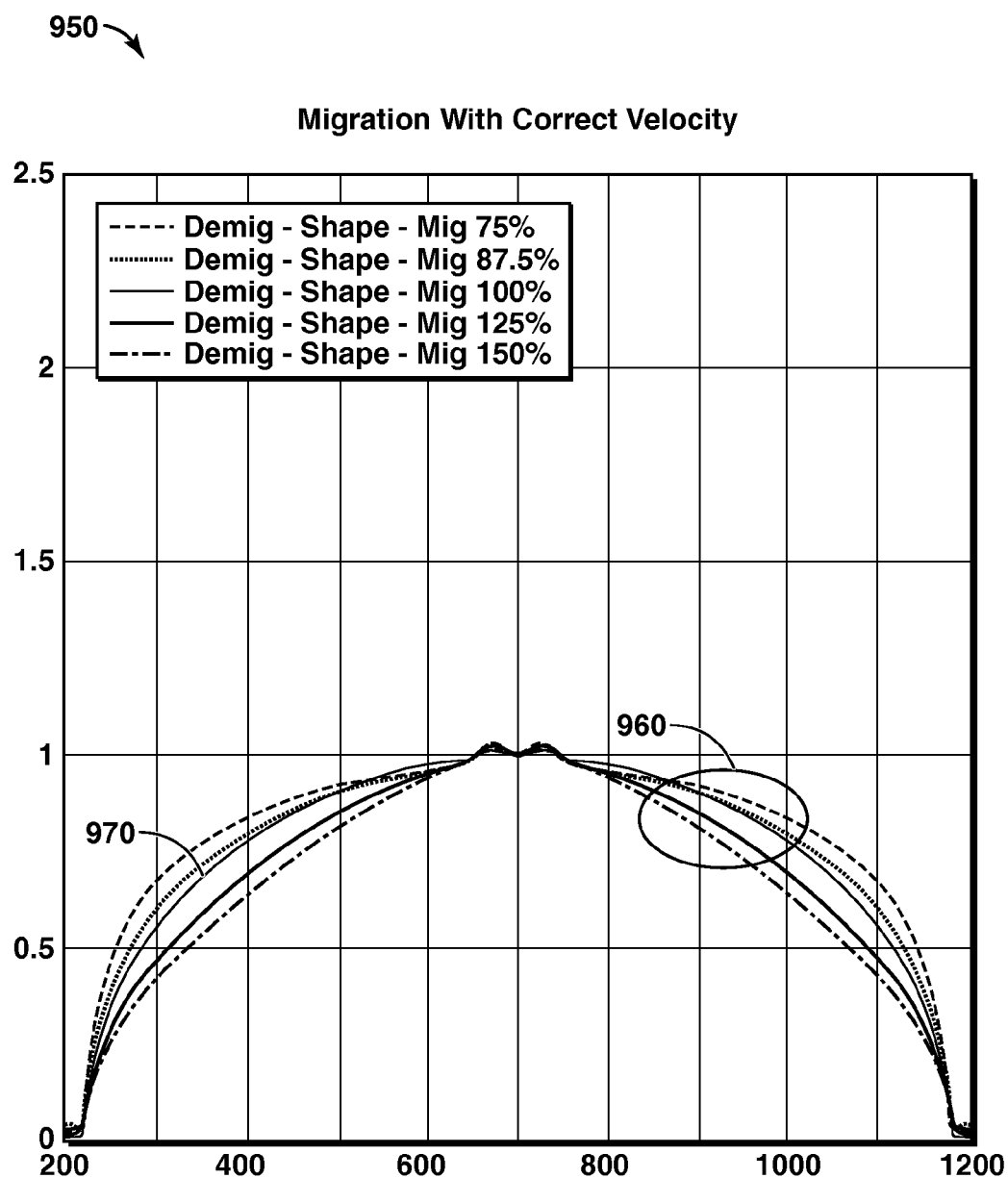
FIG. 9B is a graphical view showing amplitude variation with respect to the migration impulse response of FIG. 5A and over a range of migration velocities.

FIG. 9A is a graphical view showing a correct relative amplitude variation along the migration impulse response of FIG. 5A and a relative amplitude variation along the migration impulse response of FIG. 5B (spectral shaping post-migration). FIG. 9B is a graphical view showing amplitude variation with respect to the migration impulse response of FIG. 5A and over a range of migration velocities. Referring to FIG. 9A, a graphical view 900 of migration applied with a correct velocity, e.g., known velocity is shown having correct relative amplitudes along migration impulse response 910 of FIG. 5A and relative amplitudes along the response of FIG. 5B corresponding to post-migration application of spectral shaping 920. Referring to FIG. 9B, a graphical view 950 showing demigration/shaping/remigration, e.g., such as process 800, across a range of velocities, demonstrates various curves corresponding to the relative amplitude variation along the migration impulse response. The input data to the process 800 was the migration impulse response of FIG. 5A. Each curve shown in FIG. 9B corresponds to a different velocity, e.g., a set of curves 960 ranging from approximately 75% to 150% of the correct (actual) velocity 970. The result corresponding to the correct velocity 910, 970 is shown with an arrow in FIGS. 9A and 9B, respectively. The variation described by the set of curves 960 in FIG. 9B is more robust than the equivalent result achieved after post-migration shaping, shown in FIG. 9A.

Therefore, even when the demigration and remigration steps are performed with velocities that are very different from the actual value, the amplitude variation of the migration operator much more closely approximates the correct result than what is achieved when spectral shaping is applied after migration. This relative insensitivity of the results to the migration velocity values is one of the observations that supports the demigration/shaping/remigration process 800 described hereinabove. Since the demigration/shaping/remigration process 800 may be applied with even very simple migration algorithms, e.g., with only constant-velocity or laterally invariant models, a robust and computational process is achieved with process 800. Due to the computational efficiency of such algorithms, the demigration/shaping/remigration process 800 may be orders of magnitude faster and less expensive than the process 700 (spectral shaping before migration).

Figure 2:
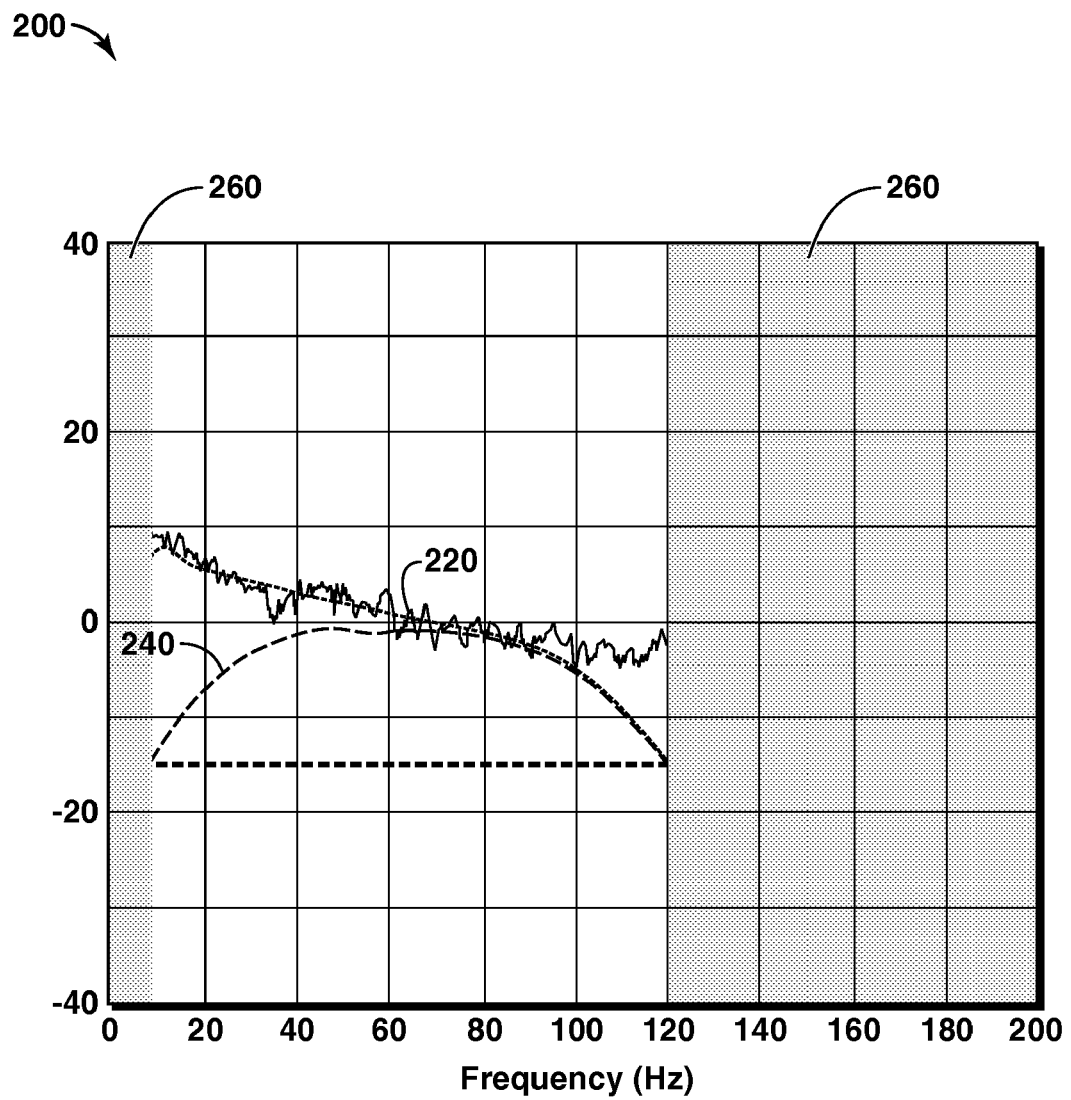
FIG. 2 is a graphical view of seismic and log spectra of the background art compared in terms of amplitude and frequency.
Figure 3:
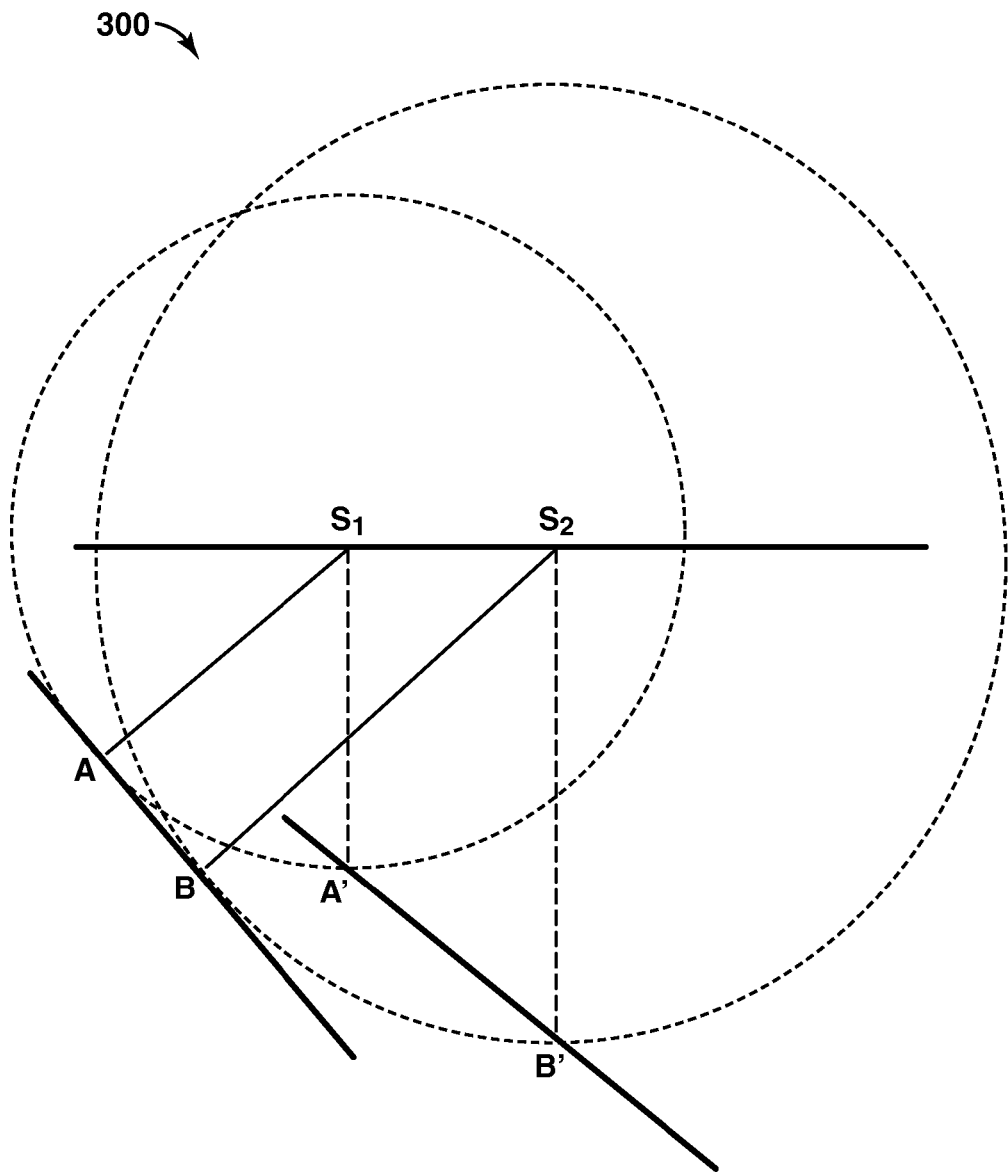
FIG. 3 is a schematic view of plotted reflection pulses of the background art showing migrated reflector segments and distorted reflector segments.
Figure 10:
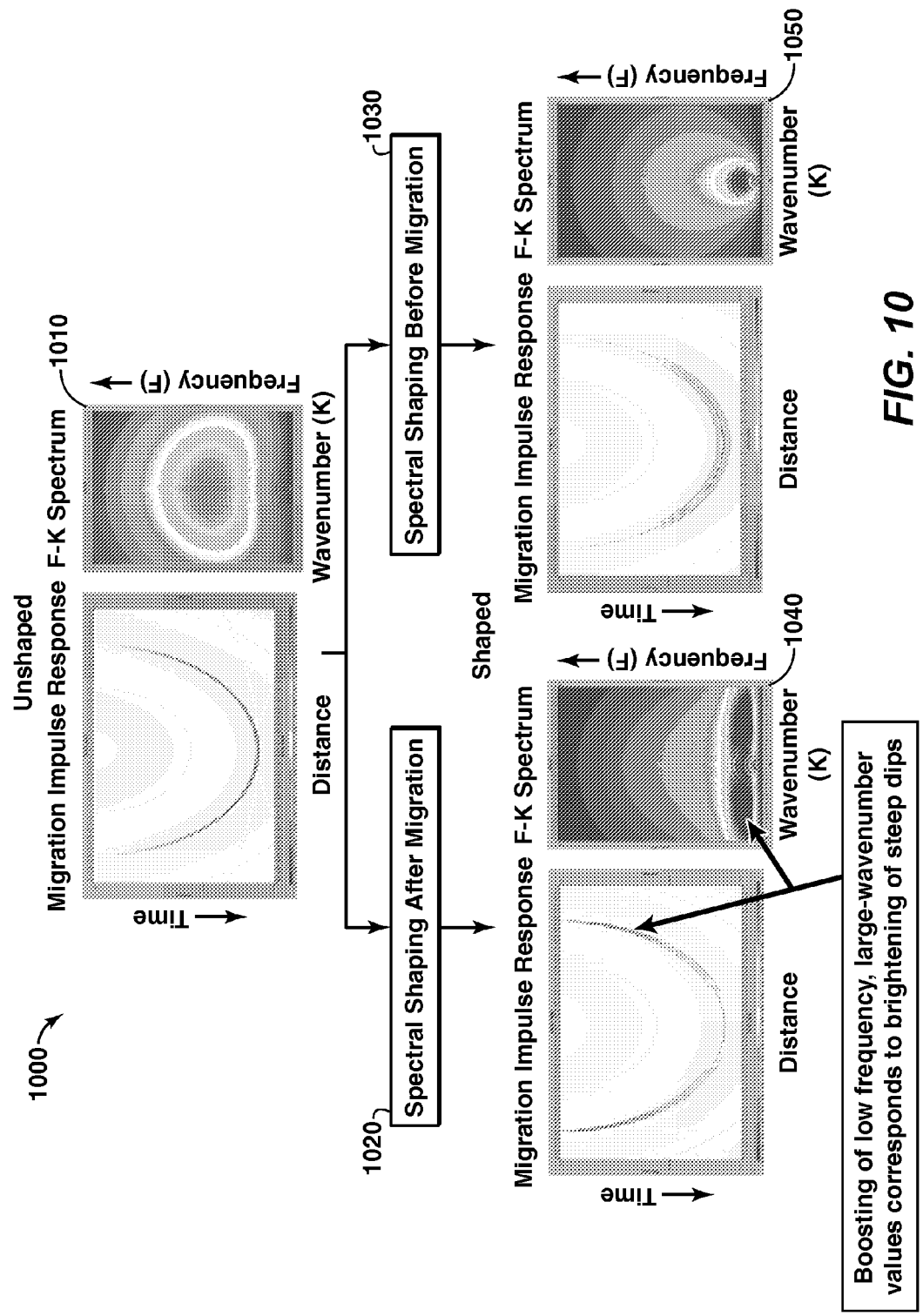
FIG. 10 is a comparative flowchart showing a frequency-wavenumber (F-K) spectrum generated by applying spectral shaping inversion before and after migration.

FIG. 10 is a comparative flowchart showing a frequency-wavenumber (F-K) spectrum generated by applying spectral shaping inversion before and after migration by process 1000. If one assumes a constant-velocity subsurface, the demigration/shaping/remigration process 800 can be equivalently performed with a single operator applied after migration. Referring to FIG. 2, an analogy with spectral shaping is an operator transforming the frequency spectrum of the original data. The spectral shaping concept is extended to modify not just the frequency (temporal), but also the wavenumber (spatial) spectrum of the data, e.g., as seen in process 1000 (FIG. 10). Instead of shaping the one-dimensional spectra of the seismic data, e.g., generated with a Fourier transform of the seismic traces along the time dimension, the two-dimensional spectra or three-dimensional spectra is shaped. For 2-D seismic data, the spectra are generated with a two-dimensional Fourier transform of the seismic traces along the time and horizontal distance, e.g., along the x-axis. For 3-D seismic data, the spectra are generated with a three-dimensional Fourier transform of the seismic traces along the time and two horizontal dimensions, e.g., along the x and y axes.

Referring to FIG. 10, the migration impulse responses 501-503 of FIGS. 5A-5C, e.g., unshaped 501, shaping after migration 502 and shaping before migration 503 are shown with corresponding two-dimensional spectra 1010, 1040, 1050. The vertical axis for the spectra is frequency (F) and the horizontal axis is wavenumber (K). Wavenumber is a measure of the variation in space, similar to the way frequency is a measure of the variation in time. After spectral shaping, low-frequency energy is boosted considerably. However, there is a significant difference between the pre-migration shaped spectra 1050 generated with spectral shaping before migration 1030, and the post-migration shaped spectra 1040 generated with spectral shaping after migration 1020. Shaping after migration 1020 enhances low-frequency energy for all values of wavenumber, and the large boost for large wavenumber values corresponds to the brightening of the steeply-dipping flanks of the impulse response. In contrast, with shaping before migration 1030, only the small-wavenumber, low-frequency part of the two-dimensional spectrum is boosted.

Figure 11A:
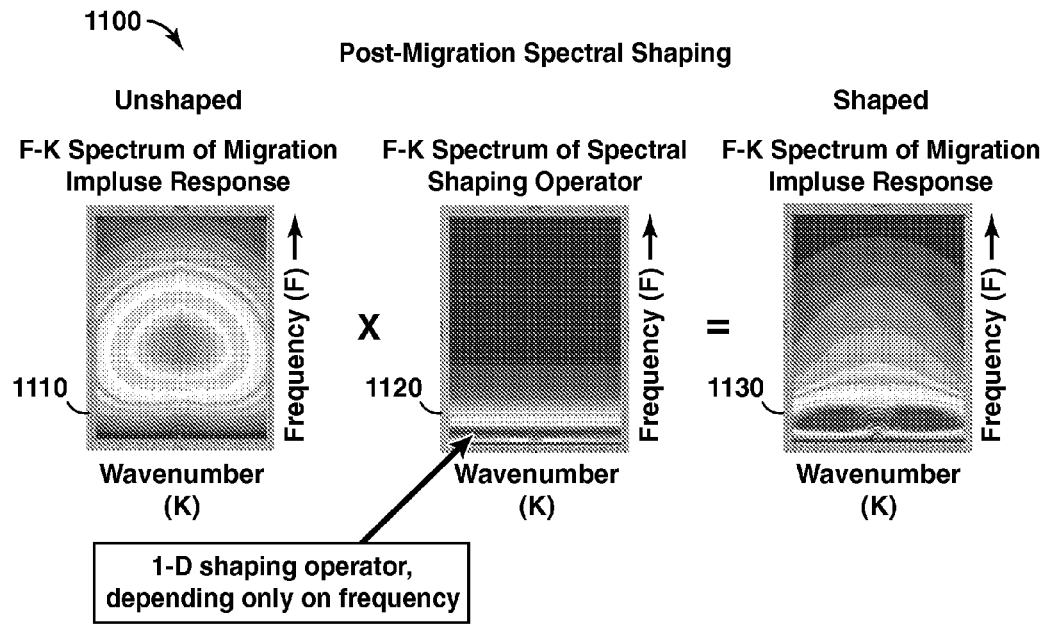
FIG. 11A is a view of a process for generating a shaped frequency-wavenumber (F-K) spectrum of a migration impulse response (post-migration).
Figure 11B:
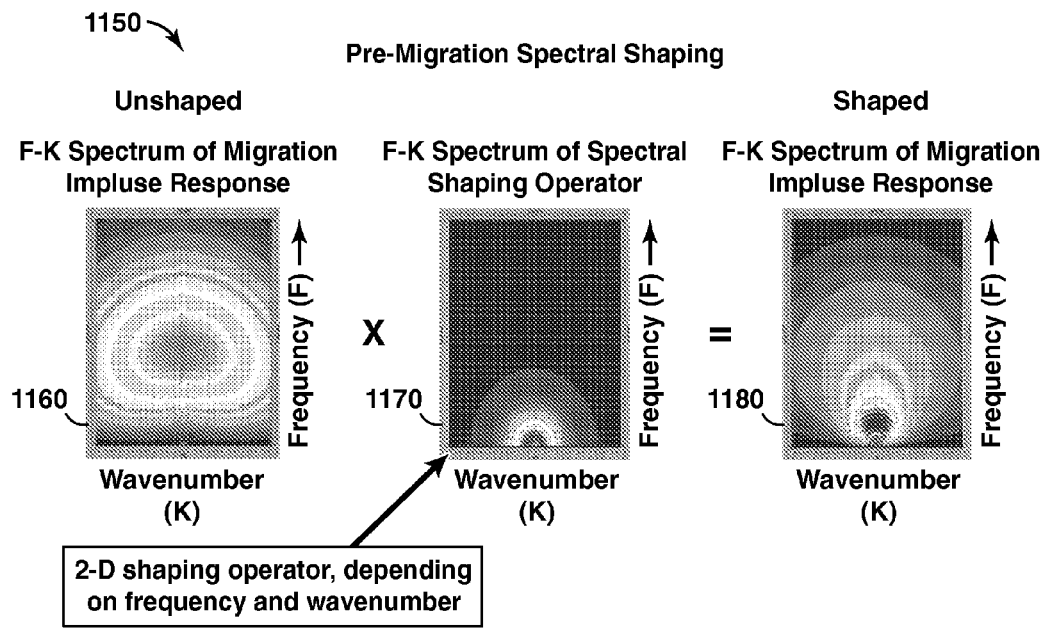
FIG. 11B is a view of a process for generating a shaped frequency-wavenumber (F-K) spectrum of a migration impulse response (before migration).

FIG. 11A is a view of a process for generating a frequency-wavenumber (F-K) spectrum of a migration impulse response with shaping applied post-migration. FIG. 11B is a view of a process for generating a frequency-wavenumber (F-K) spectrum of a migration impulse response with shaping applied before migration. Referring to FIGS. 11A-11B, the effect of spectral shaping after migration 1100 and before migration 1150 is expressed in the two-dimensional Fourier (F-K) domain. In both cases, the migration impulse response is shaped by multiplying the spectrum of the original response 1110, 1160 with the spectrum of the shaping operator 1120, 1170.

However, the operators for the post-migration spectral shaping and pre-migration spectral shaping cases are very different. Referring to FIG. 11A, post-migration spectral shaping is essentially one-dimensional, e.g., the shaping operator is only dependent on frequency, and is the same for all wavenumbers. Referring to FIG. 11B, pre-migration spectral shaping is two-dimensional, e.g., the value of the shaping operator is variable with changes in either frequency or wavenumber. For constant velocity, pre-migration shaping with a 1-D (frequency only) shaping operator is equivalent to post-migration shaping with the 2-D (frequency-wavenumber) operator shown in FIGS. 11A-11B.

The shaping of the migration impulse response 1110, 1160 can be implemented in the two-dimensional (F-K) Fourier domain by multiplying the spectrum of the original response with the spectrum of the shaping operator to achieve the shaped responses 1130, 1180. The difference between the F-K spectra 1120, 1170 of the operators for the two cases is also apparent. Post migration spectral shaping 1120 has a F-K spectra response that is the same for all wavenumbers. In fact, the wavenumber axis is ignored and the operator is designed on the basis of the frequency axis only, e.g., in effect a one-dimensional operator. Premigration shaping 1170, in effect amounts to a two dimensional operator, whose values depend not only on frequency, but also on wavenumber. While one-dimensional spectral shaping boosts small and large wavenumbers for low frequencies 1130, two-dimensional spectral shaping will only boost the small-wavenumber, low-frequency part of the spectrum 1180.

For the constant-velocity case described, spectral shaping can be applied correctly in two ways: (i) apply one-dimensional (frequency only) spectral shaping and then migrate; (ii) migrate and then apply two-dimensional (frequency-wavenumber) spectral shaping. For the constant-velocity case, the frequency-wavenumber spectrum is independent of the location, e.g., apex time, of the operator, and so the constant-velocity approach is feasible. However, when the velocity is variable, these assumptions are not true any more. The equivalence (in the case of constant velocity) of one-dimensional premigration spectral shaping and two-dimensional post migration spectral shaping can be easily explained. It is well known that, for constant-velocity migration, the F-K spectrum $P_M$ of the migrated data is related to the F-K spectrum $P_U$ of the unmigrated data, through the relationship:

$$P_M(F,K) = P_U(\sqrt{F^2 + K^2(v/2\pi)^2}, K) \quad (11)$$

where F is frequency, K is wavenumber, and v is the migration velocity. This relationship implies that the energy in the F-K spectrum moves to a lower frequency after migration, but remains at the same wavenumber. Equation (11) shows how F-K spectra get transformed by migration. The F-K spectrum of a one-dimensional (frequency-only) shaping filter $S_U$ (such as the one shown in FIG. 11A for the post-migration case), does not depend on K, and, according to equation (5), after migration the filter gets transformed to a truly two-dimensional F-K filter $S_M$, according to the equation (12):

$$S_M(F,K) = S_U(\sqrt{F^2 + K^2(v/2\pi)^2}) \quad (12)$$

Figure 12:
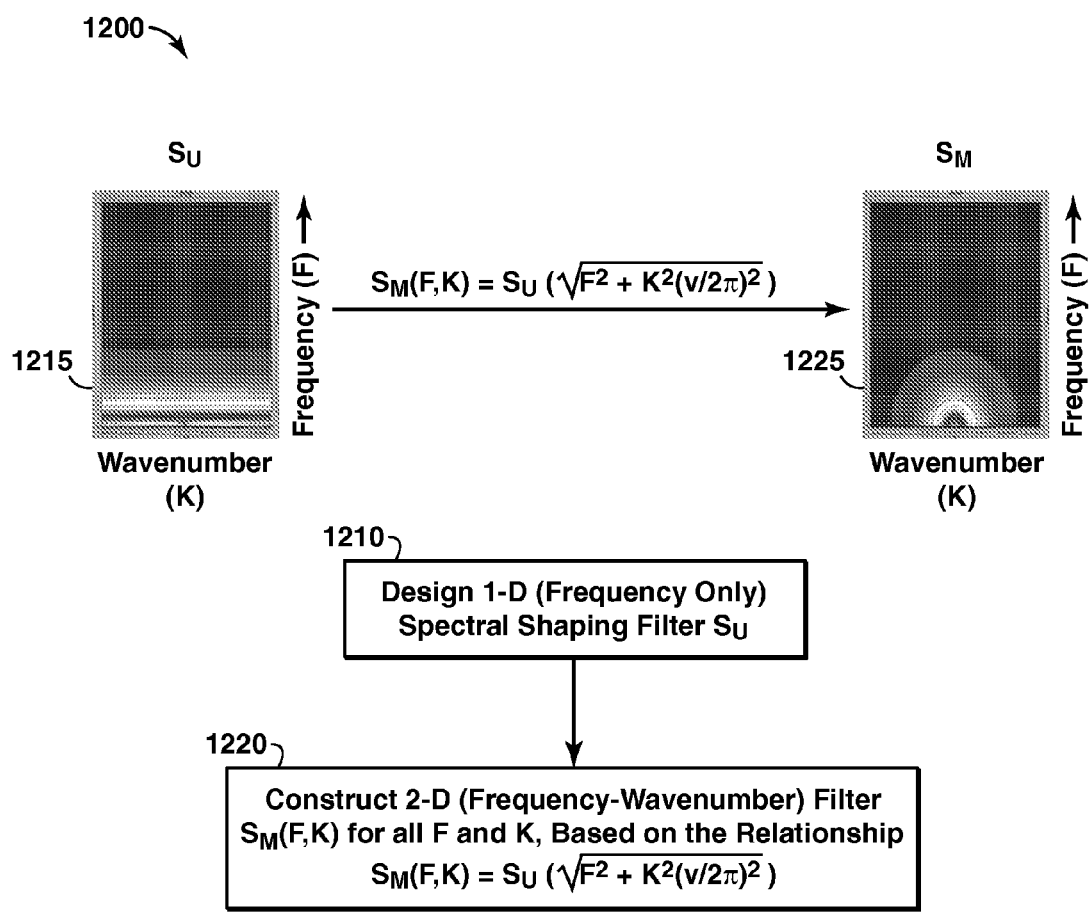
FIG. 12 is a flowchart of a process for constructing a two-dimensional (frequency-wavenumber) shaping operator from a one-dimensional (frequency only) shaping operator.

FIG. 12 is a flowchart of a process 1200 for constructing a two-dimensional (frequency-wavenumber) shaping operator 1225 from a one-dimensional (frequency only) shaping operator 1215. Referring to FIG. 12, the construction 1220 of a two-dimensional (frequency-wavenumber) shaping operator 1225 is based on a one-dimensional (frequency only) shaping operator 1215 designed in step 1210. For constant velocity, either the one-dimensional operator is applied before migration, and then migrated, or the two-dimensional operator is applied after migration to achieve the same results. In either case, the results will not suffer from a steep-dip amplification problem.

Figure 13:
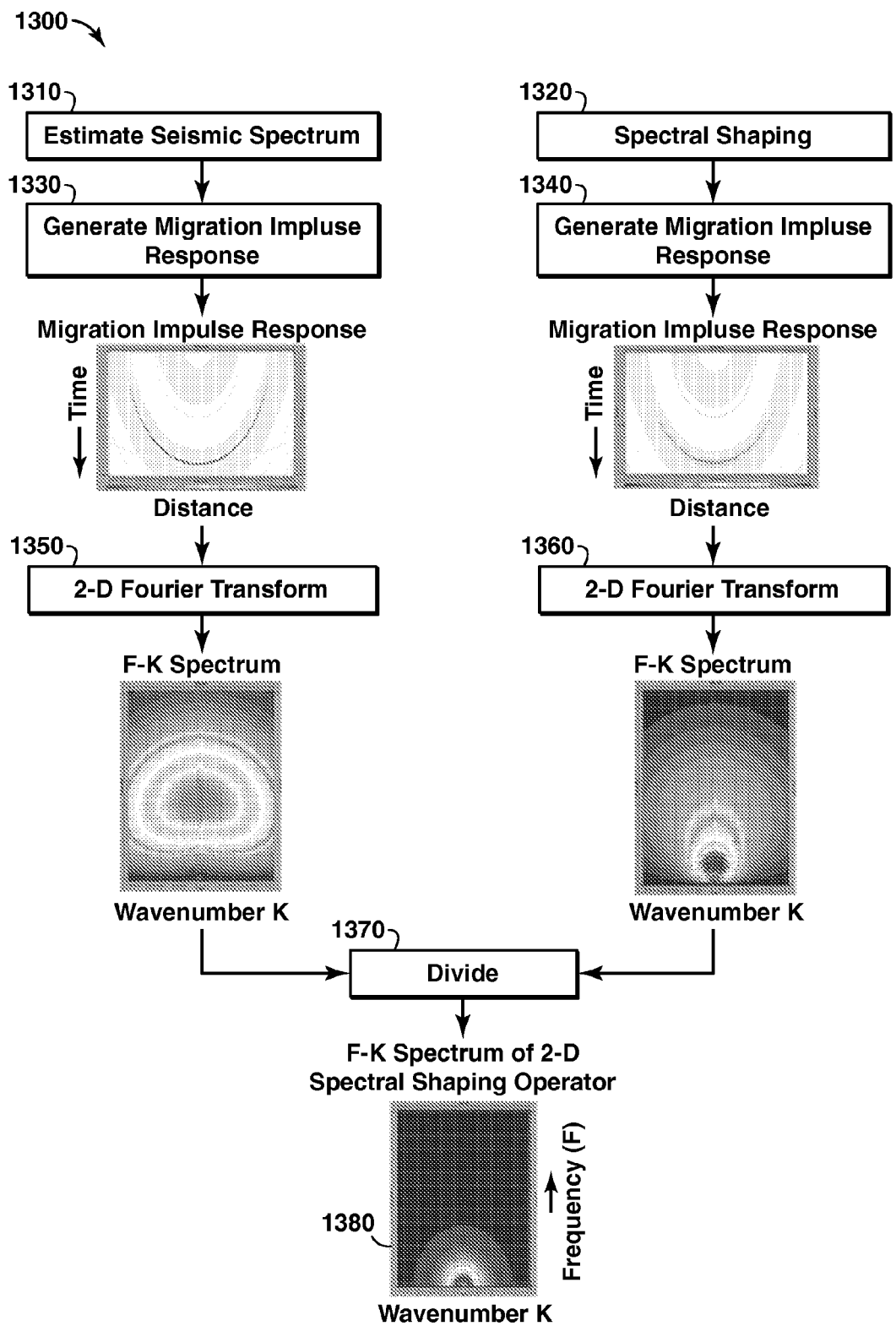
FIG. 13 is a flowchart of an alternative process for constructing a two-dimensional shaping operator.

Referring to FIG. 13, an alternative process 1300 for constructing a two-dimensional shaping operator 1380 requires an estimate of the seismic spectrum 1310. Assuming constant velocity, the operator 1380 can be applied after migration to produce spectrally shaped data with the correct amplitude variation as a function of dip, e.g., without suffering from the steep-dip amplification problem. First, the migration impulse response is constructed 1330, using the original estimated seismic spectrum. The migration impulse response is also constructed 1340 after applying spectral shaping 1320 to the spectrum 1310, e.g., using a conventional one-dimensional (frequency only) spectral shaping operator. The two-dimensional (frequency (F)-wavenumber (K)) spectra for each of these two impulse responses is calculated 1350, 1360, using a two-dimensional Fourier transform. The ratio of these two-dimensional spectra is obtained 1370, e.g., the ratio 1370 defines the frequency response of a two-dimensional shaping operator. In order to spectrally shape the migrated seismic data, the two-dimensional Fourier transforms are calculated, and the transform is multiplied with the frequency response of the two-dimensional shaping operator derived hereinabove. Spectrally shaped migrated data, not suffering from the steep-dip amplification problem, is generated with an inverse transform back.

Figure 14:
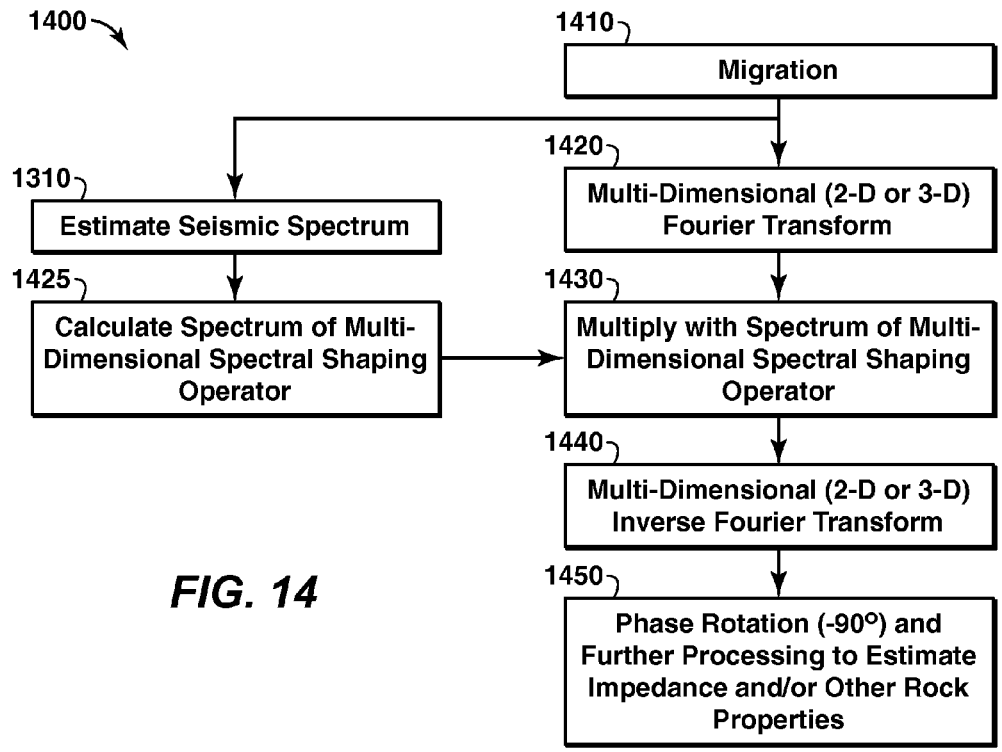
FIG. 14 is a flowchart of a process for estimating a physical property of the subsurface which includes applying a multi-dimensional spectral shaping filter for performing seismic inversion.

FIG. 14 is a flowchart of a process 1400 for estimating a physical property of the subsurface which includes applying a multi-dimensional spectral shaping filter 1430 for performing seismic inversion. Referring to FIG. 14, an exemplary seismic inversion process 1400 based on multi-dimensional spectral shaping is shown. A migrated set of data is created in step 1410. The seismic spectrum is estimated 1415 and the spectrum of the multi-dimensional, spectral shaping operator is calculated 1425. A multi-dimensional Fourier transform, e.g., 2-D or 3-D, is performed on the migrated data 1420. In step 1430, the multi-dimensional spectral shaping operator 1425 is multiplied 1430 with the result of step 1420. A multi-dimensional (2-D or 3-D) inverse Fourier transform is performed in step 1440, and a phase rotation, e.g., −90°, is applied 1450 along with any additional processing to estimate one or more physical or seismic properties of the subsurface region, such as impedance.

The process 1400 can be applied to two dimensional data (horizontal distance and time) and/or can be easily generalized for 3-D data. The main difference for the three dimensional case is that the three-dimensional (frequency (F)-X wavenumber (Kx)-Y wavenumber (Ky)) spectra is calculated, e.g., instead of the two-dimensional (F-K) spectra. If one assumes a constant-velocity subsurface, the multi-dimensional spectral shaping approach is even more computationally efficient than a demigration/shaping/remigration process 800, described hereinabove.

Figure 15A:
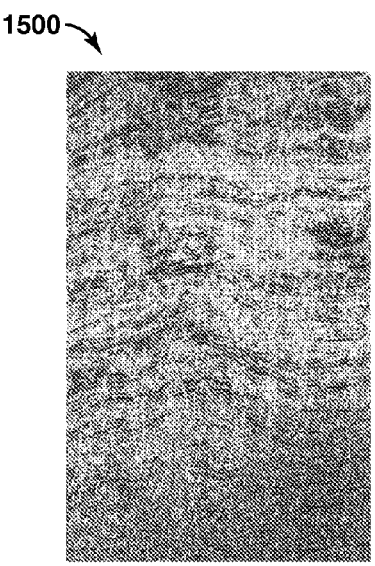
FIG. 15A is a screenshot of test seismic data.
Figure 15B:
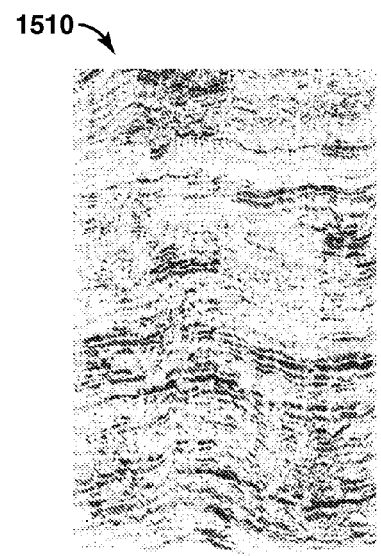
FIG. 15B is a screenshot of test seismic data after application of an exemplary demigration/spectral shaping/remigration process.
Figure 15C:
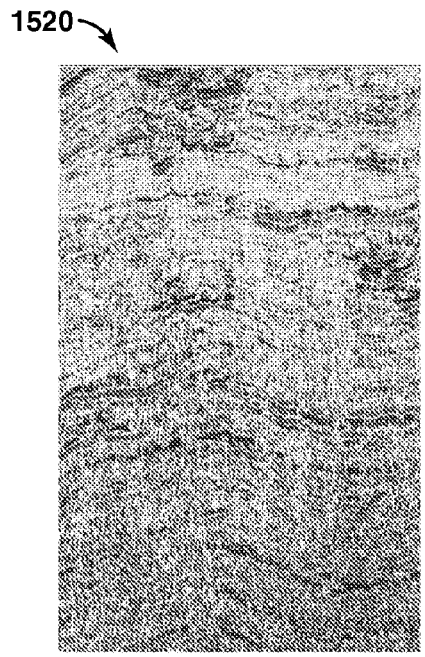
FIG. 15C is a screenshot of test seismic data after application of a post-migration spectral shaping filter.

FIG. 15A is a screenshot 1500 of test seismic data. FIG. 15B is a screenshot 1510 of test seismic data after application of an exemplary demigration/spectral shaping/remigration process. FIG. 15C is a screenshot 1520 of test seismic data after application of a post-migration spectral shaping filter. Referring to FIGS. 15A-15C, the same shaping filter was applied in 1510 and 1520. However, the result 1510 shown in FIG. 15B demonstrates significant improvement of the signal-to-noise ratio of the original test data 1500. Further, the result 1510 is clearly superior to the result 1520 achieved in FIG. 15C. The improvement in the signal-to-noise ratio of the data is evident, e.g., the result 1520 achieved in FIG. 15C with simple post-migration spectral shaping is inferior to the result 1510 shown in FIG. 15B. Specifically, the noise in FIG. 15C has a vertical appearance, e.g., the term "curtain effect" is sometimes used in practice to describe this type of noise, as the noise mostly includes steeply-dipping components that were enhanced with post-migration spectral shaping.

Figure 16A:
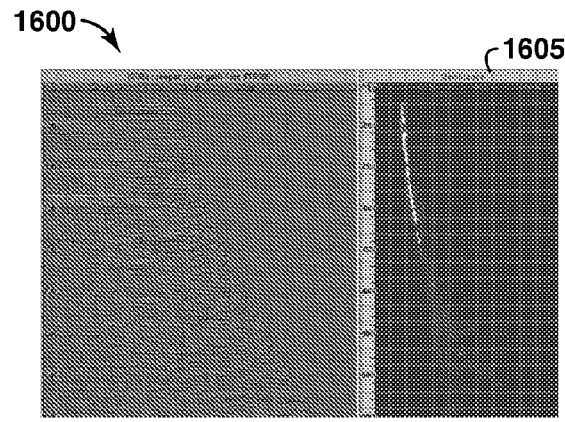
FIG. 16A is a screenshot of a migrated CDP gather and a corresponding velocity semblance panel.
Figure 16B:
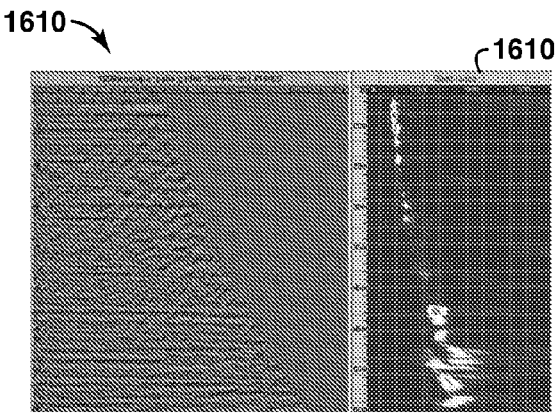
FIG. 16B is a screenshot of a migrated CDP gather and a corresponding velocity semblance panel with spectral shaping inversion applied after migration.
Figure 16C:
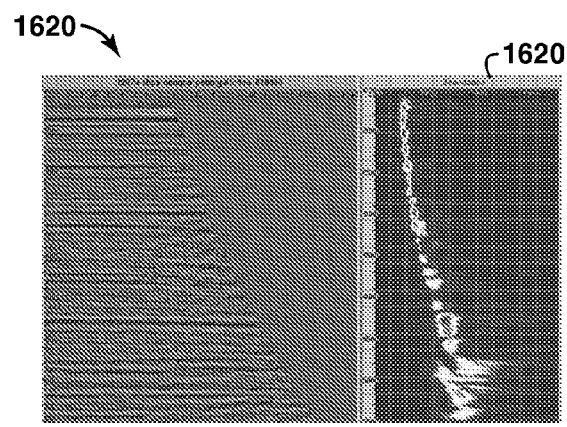
FIG. 16C is a screenshot of a migrated CDP gather and a corresponding velocity semblance panel with spectral shaping applied before migration.

FIG. 16A is a screenshot 1600 of a migrated common depth point (CDP) gather 1605 and a corresponding velocity semblance panel 1608. FIG. 16B is a screenshot 1610 of a migrated CDP gather 1615 and a corresponding velocity semblance panel 1618 with spectral shaping inversion applied after migration. FIG. 16C is a screenshot 1620 of a migrated CDP gather 1625 and a corresponding velocity semblance panel 1628 with spectral shaping applied before migration. Referring to FIGS. 16A-16B, the clarity of the seismic events 1625 and the semblance peaks 1628 is clearly superior when spectral shaping is applied before migration, e.g., 1620, 1628 of FIG. 16C. Referring to FIG. 16A, a migrated common-depth-point (CDP) gather 1605 and the associated velocity semblance panel 1608 are shown. A CDP gather is a collection of seismic traces corresponding to reflections from the same subsurface points, but at different angles of incidence. Velocity semblances measure the coherence of seismic events for different times. The horizontal locations of semblance peaks (bright amplitudes) within the semblance panels provide measures of seismic velocities to be used for flattening and stacking, e.g., summing, the seismic events within the CDP gather from which they were produced. In general, the brighter and better defined the semblances, the easier it becomes to determine velocities. Referring to FIGS. 16B-16C, the effect on the gather and the associated semblance panel of applying spectral shaping after migration, and the equivalent results with spectral shaping applied before migration are shown, respectively. The clarity of the seismic events and the semblance peaks is superior when spectral shaping is applied before migration, e.g., FIG. 16C (1625, 1628).

A number of embodiments have been described. Nevertheless, it will be understood that various modifications may be made without departing from the spirit and scope of the invention. For example, although the foregoing implementations have described the application of a spectral shaping inversion filter, alternative inversion algorithms can be applied after migration, e.g., the same amplification of steeply-dipping energy observed with the spectral shaping filter would occur if another inversion algorithm was applied after migration. Although the methods described here were presented within the context of seismic inversion, this is not the only potential application of the technology. Applying the methods to CDP gathers, as in the last example, often improves the signal-to-noise ratio of the gathers significantly. The improved gathers can then be used for more accurate velocity estimation and Amplitude-Versus-Offset (AVO) analysis. Although the foregoing processes were presented in association with the spectral shaping filters encountered in seismic inversion, the same concept can be easily extended to improve the amplitude-preservation characteristics, e.g., ratio of flat to dipping events, of any filtering process applied to migrated seismic data, e.g., bandpass filtering, spectral decomposition.

One or more additional processing techniques may be applied to the data, e.g., before and/or after spectral shaping and/or migration has been performed in one of the aforementioned techniques. For example, one or more additional, exemplary processing techniques that may be incorporated into one or more of the aforementioned process include a de-signature process, de-ghosting process, random noise attenuation, multiple attenuation, a deconvolution process, estimation of stacking and migration velocities, or other processing techniques further described in "Spectral Shaping Inversion for Elastic and Rock Property Estimation," by Lazaratos, 2006. One or more additional processing techniques may be performed before, after, or intermediate to the processing steps described hereinabove, e.g., between the obtaining of seismic data and prior to converting the data to zero phase. The data is typically converted to zero phase prior to the application of any migration and/or inversion technique, e.g., spectral shaping inversion. Stacking velocities of migrated data, if necessary, may be refined using shaped seismic data and the one or more stacks generated prior to the application of a phase rotation, e.g., angle stacks may be generated and a $-90°$ phase rotation and appropriate linear combinations may be applied to the generated angle stacks to generate estimates of bandlimited P-Impedance and S-Impedance, Vp/Vs, and/or other seismic or physical properties.

Figure 17:
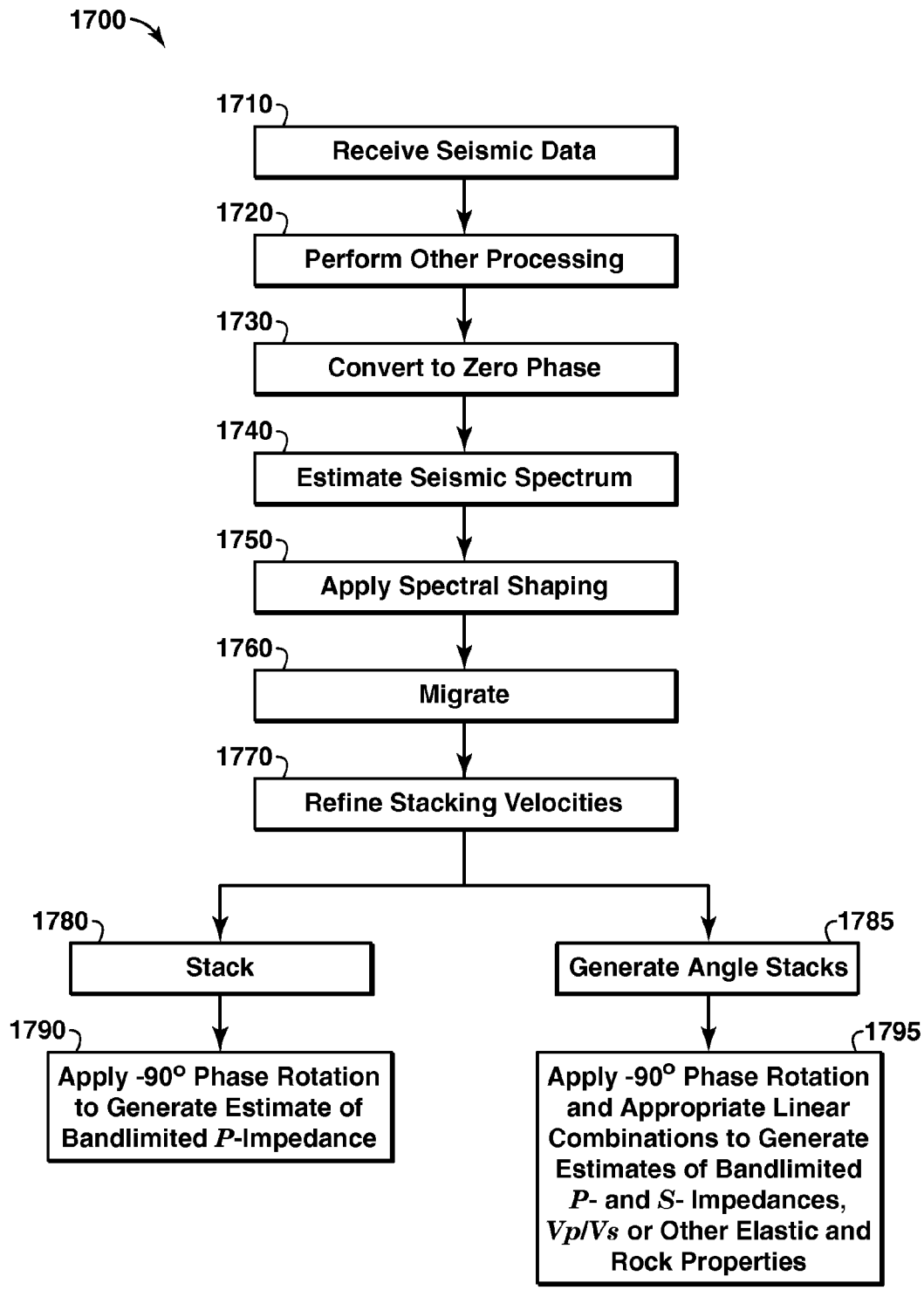
FIG. 17 is a flowchart of an exemplary process for generating a geophysical model of one or more properties based on applying spectral shaping inversion prior to migration.
Figure 18:
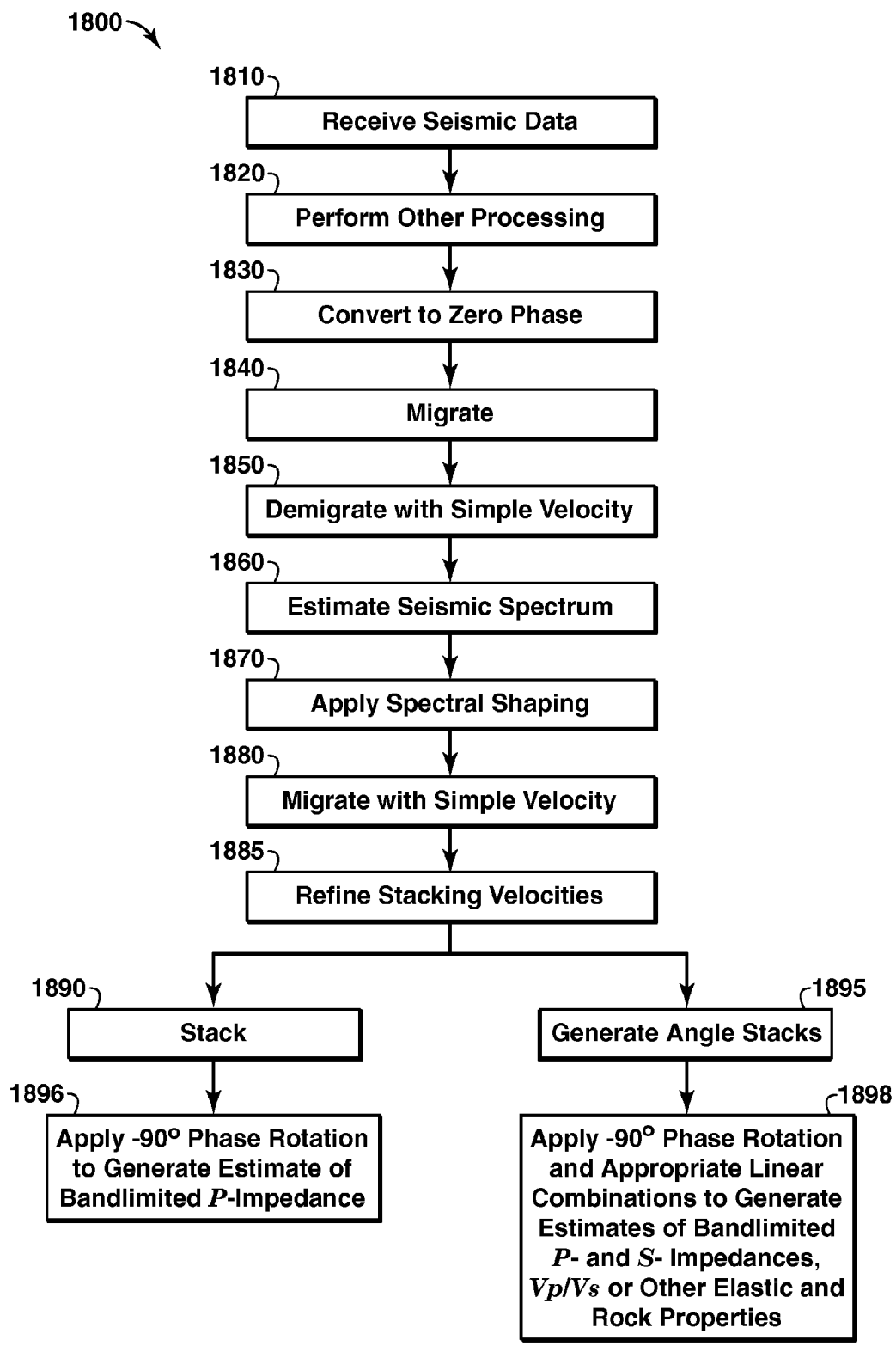
FIG. 18 is a flowchart of an exemplary process for generating a geophysical model of one or more properties based on a demigration/shaping/remigration technique.
Figure 19:
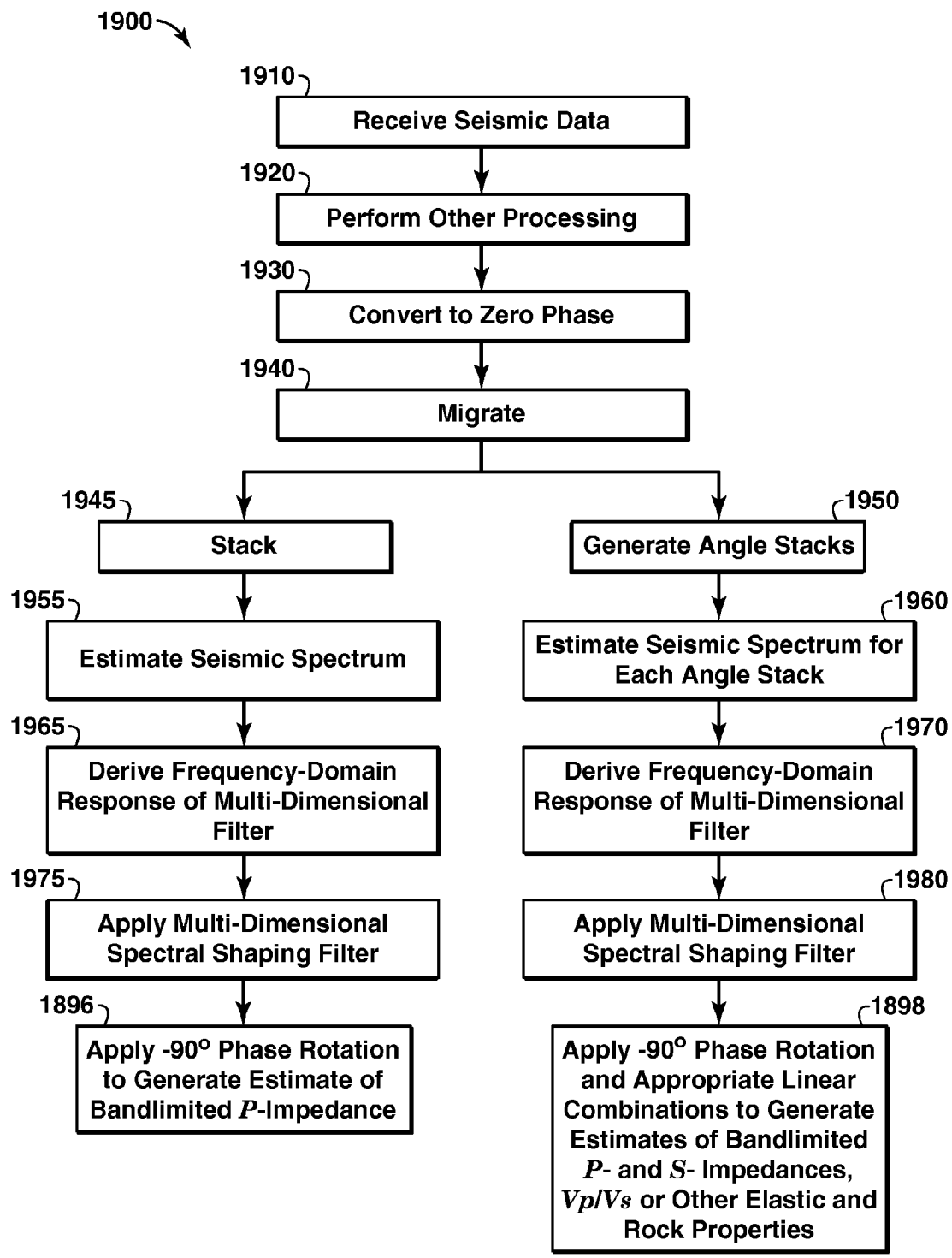
FIG. 19 is a flowchart of an exemplary process for generating a geophysical model of one or more properties based on applying a 3-D or 2-D spectral shaping filter after stacking.

The data may be stacked before or after the spectral shaping of any data, e.g., stacking may be performed post-migration and post-inversion, post-migration and pre-inversion, and/or at other points in the overall data processing routine. For example, FIG. 17 is a flowchart of an exemplary process 1700 for generating a geophysical model of one or more properties based on applying spectral shaping inversion prior to migration. FIG. 18 is a flowchart of an exemplary process 1800 for generating a geophysical model of one or more properties based on a demigration/shaping/remigration technique. FIG. 19 is a flowchart of an exemplary process 1900 for generating a geophysical model of one or more properties based on applying a 3-D or 2-D spectral shaping filter after stacking FIG. 20 is a flowchart of an exemplary process 2000 for generating a geophysical model of one or more properties based on applying a 3-D or 2-D spectral shaping filter before stacking.

Referring to FIG. 17, process 1700 generates estimates of one or more of Bandlimited P-Impedance, Bandlimited S-Impedance, Vp/Vs and/or other elastic or other rock properties. In general, process 1700 is based upon acoustic and elastic inversion through the application of spectral shaping before migration. Seismic data is obtained 1710, and any other desired processing techniques are performed 1720 on the seismic data. For example, other processing techniques may include one or more of the following processes, such as a de-signature process, de-ghosting process, random noise attenuation, multiple attenuation, a deconvolution process, and/or estimation of stacking and migration velocities. The data is next converted to zero phase 1730 and an estimate of the seismic spectrum is generated 1740. A spectral shaping filter is applied to the data 1750 and the shaped data is migrated 1760. In step 1770, the stacking velocities are refined, if necessary, using shaped seismic data. Depending upon the desired geophysical model, the data is stacked 1780, 1785. For example, if estimates of Bandlimited P-Impedance, Bandlimited S-Impedance, Vp/Vs, and/or other elastic or other rock properties are desired, angle stacks are generated in step 1785, and a $-90°$ phase rotation and appropriate linear combinations are applied to generate the desired estimates. If Bandlimited P-Impedance is the desired estimate, the data is stacked 1780 and a $-90°$ phase rotation is applied to generate an estimate of Bandlimited P-Impedance. Stacking 1780, 1785 produces stacked data sections based on some common criteria between seismic traces. For example, seismic data can be stacked, e.g., combined, according to seismic traces having the same or similar angles, common source-receiver midpoint, common subsurface imaging location, and/or some other common criteria.

Referring to FIG. 18, process 1800 also generates estimates of one or more of Bandlimited P-Impedance, Bandlimited S-Impedance, Vp/Vs and/or other elastic or other rock properties. However, process 1800 is based upon acoustic and elastic inversion through the application of demigration/shaping/remigration. In process 1800, the application of demigration/shaping/remigration occurs prior to any stacking, e.g., stacking 1890 or generating angle stacks 1895. Specifically, seismic data is obtained 1810, and any other desired processing techniques are performed 1820 on the seismic data. The data is next converted to zero phase 1830 and then migrated 1840. The migrated data is then demigrated with a simple velocity model 1850, an estimate of the seismic spectrum is generated 1860, and a spectral shaping filter is applied to the data 1870. The shaped data is then remigrated 1880 with the same simple velocity model used in the demigration step 1850. If necessary, the stacking velocities are refined using shaped seismic data 1885. Depending upon the desired geophysical model, the data is stacked 1890, 1895 and a $-90°$ phase rotation 1896, 1898 and appropriate linear combinations 1898 are applied to generate the desired estimates.

Figure 20:
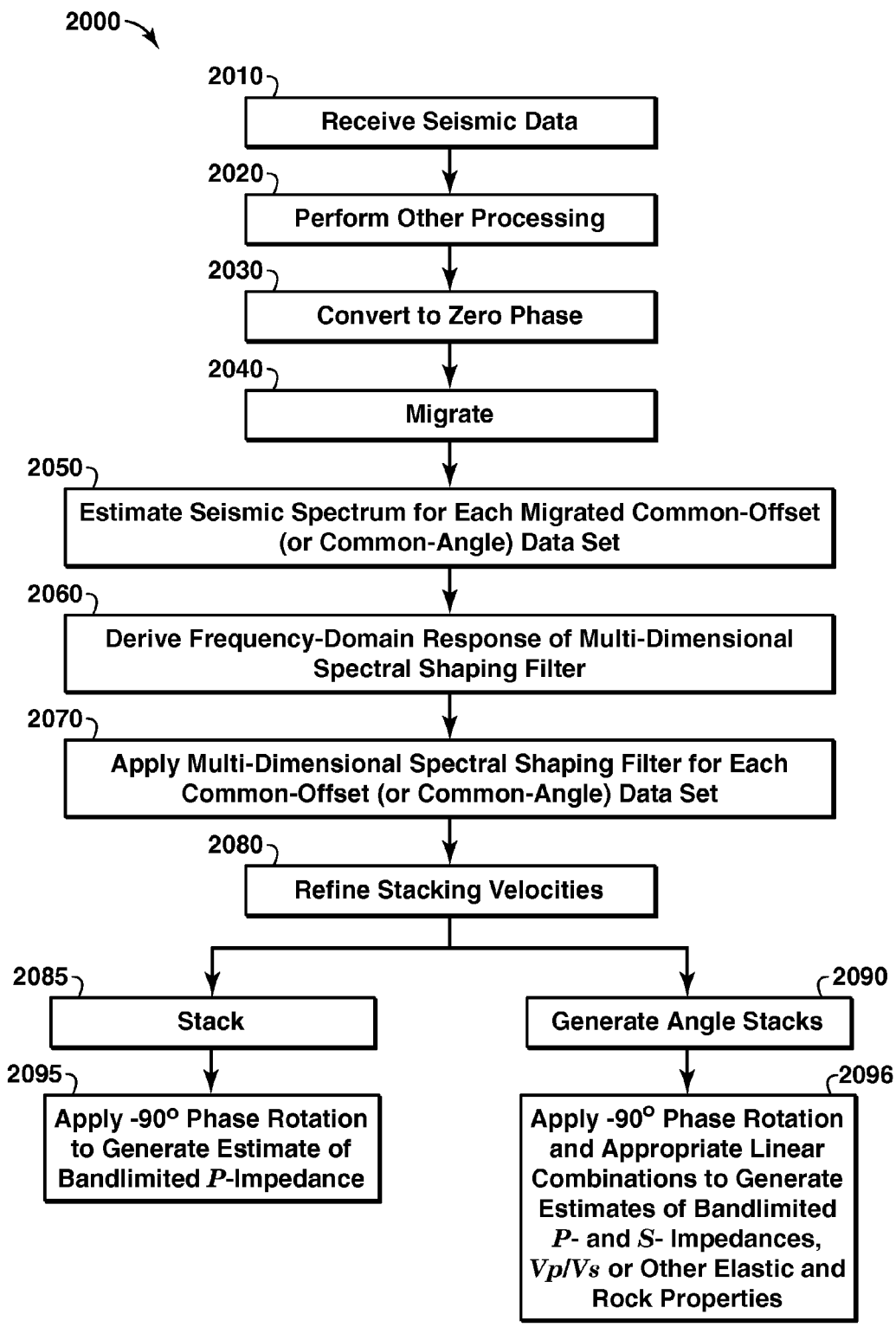
FIG. 20 is a flowchart of an exemplary process for generating a geophysical model of one or more properties based on applying a 3-D or 2-D spectral shaping filter before stacking.

Referring to FIGS. 19 and 20, processes 1900 and 2000 both generate estimates of one or more of Bandlimited P-Impedance, Bandlimited S-Impedance, Vp/Vs and/or other elastic or other rock properties through acoustic and elastic inversion based on the application of a multi-dimensional spectral shaping filter, e.g., a 2-pass 2-D (F-K) or 3-D (F-Kx-Ky) spectral shaping filter. In process 1900, the spectral shaping filter is applied after any stacking steps, e.g., stacking 1945 or generating angle stacks 1950. In process 2000, the spectral shaping filter is applied prior to any stacking steps 2085, 2090.

In process 1900, the data is obtained 1910, optionally processed 1920, and converted to zero phase 1930. The data is migrated 1940, and the migrated data is then stacked 1945, 1950. If angle stacks are generated 1950, the seismic spectrum is estimated for each angle stack 1960. A frequency domain response of a multi-dimensional spectral shaping filter is derived 1970, e.g., a 3-D (F-Kx-Ky) or 2-pass 2-D (e.g., F-K) spectral shaping filter, that converts an unshaped migration impulse response to a spectrally shaped migration impulse response when the multi-dimensional filter is applied 1980. For example, the migration impulse response is constructed using appropriate, e.g., average, constant velocity. A $-90°$ phase rotation and appropriate linear combinations are applied 1990 to generate estimates of one or more of Bandlimited P-Impedance, Bandlimited S-Impedance, Vp/Vs, or other elastic or other rock properties. If an estimate of Bandlimited P-Impedance is generated 1985, the stacked data 1945 is used to estimate a seismic spectrum 1955, the frequency-domain response of the multi-dimensional shaping filter is derived 1965, the filter applied 1975, and the $-90°$ phase rotation is applied to generate the estimate.

In process 2000, seismic data is obtained 2010, optionally processed 2020, converted to zero phase 2030, and migrated 2040. In contrast to process 1900, the seismic spectrum is estimated for each common-offset or common-angle data set 2050. A frequency-domain response of a multi-dimensional spectral shaping filter, e.g., 3-D (F-Kx-Ky) or 2-pass 2-D (e.g., F-K) spectral shaping filters, is derived for each offset or angle data set 2060. The spectral shaping filter is applied for each common-offset or common-angle data set 2070 to convert the unshaped migration impulse response to a spectrally shaped migration impulse for each offset or angle. The migration impulse response is constructed using appropriate constant velocity, e.g., average velocity. The stacking velocities are refined 2080, if necessary, using the shaped seismic data. The data is then stacked 2085, 2090 and a −90° phase rotation (and appropriate linear combinations, if necessary) applied to generate one or more estimates of Bandlimited P-Impedance, Bandlimited S-Impedance, Vp/Vs, or other elastic or other rock properties 2095, 2096.

One or more of the aforementioned processes and/or techniques, e.g., such as the application of a shaping filter, can be implemented in digital electronic circuitry, or in computer hardware, firmware, software, or in any combination thereof. Any of the aforementioned functionality may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

One or more process steps of the invention can be performed by one or more programmable processors executing a computer program to perform functions of the invention by operating on input data and generating output. One or more steps can also be performed by, and an apparatus or system can be implemented as, special purpose logic circuitry, e.g., an FPGA (field programmable gate array) or an ASIC (application-specific integrated circuit). In addition, data acquisition and display may be implemented through a dedicated data collection and/or processing system, e.g., containing data acquisition hardware, such as hydrophones and/or geophones, a processor(s), and various user and data input and output interfaces, such as a display component for graphically displaying one or more of the generated estimates obtained through any of the aforementioned process steps or processes.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

All such modifications and variations are intended to be within the scope of the present invention, as defined in the appended claims. Persons skilled in the art will also readily recognize that in preferred embodiments, at least some of the method steps method are performed on a computer, e.g., the method may be computer implemented. In such cases, the resulting model parameters may either be downloaded or saved to computer memory.

We claim:

1. A method for generating a geophysical model of a subsurface region based on seismic data, the method comprising:
   receiving seismic data corresponding to a plurality of image points;
   applying inversion simultaneously to all data in the seismic data; and
   migrating the inverted seismic data;
   wherein the inversion and migrating are performed using a computer.

2. The method of claim 1, wherein receiving seismic data comprises obtaining seismic reflection data.

3. The method of claim 1, wherein applying inversion to the seismic data comprises applying spectral shaping inversion to the seismic data.

4. The method of claim 3, wherein spectral shaping inversion comprises applying coloured inversion or Lazaratos spectral shaping inversion.

5. The method of claim 3, wherein applying spectral shaping inversion to the seismic data comprises applying a spectral shaping filter to an original seismic data spectrum to generate a shaped seismic data spectrum.

6. The method of claim 2, wherein receiving seismic data comprises obtaining an average frequency spectrum of available well log data and an average frequency spectrum of the seismic data.

7. The method of claim 2, further comprising applying spectral shaping inversion to the seismic data, including applying a spectral shaping filter to an original seismic data spectrum to generate a shaped seismic data spectrum.

8. The method of claim 2, further comprising obtaining an estimate of a seismic wavelet based on sonic and density well log data.

9. The method of claim 2, wherein an estimate of a seismic wavelet based on sonic and density well log data is not obtained prior to migrating the shaped seismic data.

10. The method of claim 1, further comprising:
    stacking the migrated data; and
    applying a phase rotation to the stacked data to generate an estimate of subsurface impedance.

11. The method of claim 10, wherein applying the phase rotation to the stacked data is a −90 degree phase rotation of the migrated seismic data and the estimate is of bandlimited P-Impedance.

12. The method of claim 2, further comprising:
    converting the seismic reflection data to zero phase prior to applying inversion; and
    applying a −90° phase rotation to the migrated seismic data to generate an estimate of impedance.

13. The method of claim 1, further comprising generating estimates of one or more of bandlimited P-Impedance, bandlimited S-Impedance, Vp/Vs, bulk modulus, shear modulus, compressional wave velocity, shear wave velocity, Vp/Vs ratio, a Lamé constant, and an anisotropy parameter.

14. A method for generating a geophysical model of a subsurface region based on seismic data, the method comprising:
    receiving migrated seismic data corresponding to a plurality of image points;

demigrating the seismic data with a migration algorithm and a simple velocity model for the subsurface region;

applying spectral shaping inversion simultaneously to all data in the demigrated seismic data; and remigrating the shaped seismic data with the migration algorithm and the simple velocity model for the subsurface region;

wherein the demigrating, remigrating, and inversion are performed using a computer.

15. The method of claim 14, further comprising applying a phase rotation to the remigrated data to generate an estimate of subsurface impedance, and wherein the simple velocity model for the subsurface region comprises a constant velocity model for the subsurface region.

16. A method for generating a geophysical model of a subsurface region based on seismic data, the method comprising:

receiving seismic reflection data;

migrating the seismic data;

applying a spectral shaping inversion filter to the migrated seismic reflection data;

stacking the seismic data; and applying a phase rotation to the stacked seismic data spectrum to generate an estimate of impedance of the subsurface region;

wherein at least the migrating, applying a spectral shaping inversion filter, stacking, and applying a phase rotation are performed using a computer.

17. The method of claim 16, wherein applying the spectral shaping inversion filter to the migrated seismic reflection data comprises:

calculating a multi-dimensional spectral shaping operator;

performing a multi-dimensional Fourier transform of the migrated data; multiplying the calculated multi-dimensional spectral shaping operator with the Fourier transform of the migrated data; and performing a multi-dimensional inverse Fourier transform.

18. A method for producing hydrocarbons from a subsurface region, comprising:

generating a geophysical model of a subsurface region based on seismic data, wherein generating the geophysical model comprises:

receiving seismic reflection data;

migrating the seismic data;

applying a spectral shaping inversion filter to the seismic reflection data;

stacking the seismic data; and applying a phase rotation to the stacked seismic data spectrum to generate an estimate of a geophysical property of the subsurface region, wherein the spectral shaping inversion is applied to reduce amplification of dipping energy by at least one of (i) applying the spectral shaping inversion filter prior to migrating the data; (ii) demigrating migrated data prior to applying the spectral shaping inversion filter and remigrating the inverted data; and (iii) calculating a multi-dimensional spectral shaping operator and multiplying the multi-dimensional spectral shaping operator with a Fourier transform of the migrated data;

drilling a well to a formation interpreted in the generated geophysical model as potentially hydrocarbon bearing; and producing hydrocarbons from the well.

* * * * *